United States Patent
Martins Junior et al.

(10) Patent No.: US 12,110,359 B2
(45) Date of Patent: Oct. 8, 2024

(54) CONTINUOUS PROCESS FOR METALLOCENE PRELIMINARY POLYMERIZATION FOR GAS-PHASE POLYMERIZATION PROCESS

(71) Applicant: Braskem S.A., Camaçari (BR)

(72) Inventors: Olavo Martins Junior, São Paulo (BR); Fabio Andre Kunrath, São Paulo (BR); Márcia Silva Lacerda Miranda, São Paulo (BR)

(73) Assignee: Braskem S.A., Camaçari (BR)

( * ) Notice: Subject to any disclaimer, the term of this patent is extended or adjusted under 35 U.S.C. 154(b) by 102 days.

(21) Appl. No.: 17/866,410

(22) Filed: Jul. 15, 2022

(65) Prior Publication Data
US 2023/0036349 A1 Feb. 2, 2023

Related U.S. Application Data

(60) Provisional application No. 63/222,310, filed on Jul. 15, 2021.

(51) Int. Cl.
 *C08F 4/6592* (2006.01)
 *C08F 4/14* (2006.01)
 (Continued)

(52) U.S. Cl.
 CPC ............ *C08F 4/14* (2013.01); *C08F 4/65916* (2013.01); *C08F 210/02* (2013.01); *C08F 210/16* (2013.01)

(58) Field of Classification Search
 CPC ... C08F 4/65916; C08F 210/16; C08F 4/6592
 See application file for complete search history.

(56) References Cited

U.S. PATENT DOCUMENTS 5,705,578 A 1/1998 Peifer et al.
6,391,817 B1 5/2002 Brinen
(Continued)

FOREIGN PATENT DOCUMENTS

CN 107973868 B 2/2021
EP 0810234 A2 12/1997
(Continued)

OTHER PUBLICATIONS

International Search Report issued in corresponding International Application No. PCT/IB2022/020053, mailed Dec. 19, 2022 (20 pages).

*Primary Examiner* — Caixia Lu
(74) *Attorney, Agent, or Firm* — Osha Bergman Watanabe & Burton LLP

(57) ABSTRACT

A process for preliminary polymerization may include washing a catalyst mud comprising a supported metallocene catalyst with at least one saturated hydrocarbon at a temperature from 0° C. to 40° C., a pressure from 20 to 40 kgf/cm², and a residence time of at least 30 minutes; continuously feeding the washed catalytic mud to a continuous pre-polymerization reactor; and pre-polymerizing, in the continuous pre-polymerization reactor, ethylene and at least one $C_4$ to $C_{10}$ α-olefin as comonomer, with the washed catalytic mud, to produce a pre-polymer; wherein an average residence time in the continuous pre-polymerization reactor is more than 90 minutes and less than 240 minutes, a reactor temperature is from 10° C. to 50° C., and a reactor pressure from 20 to 40 kgf/cm².

15 Claims, 12 Drawing Sheets

(51) Int. Cl.
  *C08F 4/659* (2006.01)
  *C08F 210/02* (2006.01)
  *C08F 210/16* (2006.01)

(56) References Cited

U.S. PATENT DOCUMENTS

| | | |
|---|---|---|
| 6,534,609 B2 | 3/2003 | Mitchell et al. |
| 8,410,231 B2 | 4/2013 | Kawashima et al. |
| 2011/0021726 A1 | 1/2011 | Kawashima et al. |

FOREIGN PATENT DOCUMENTS

| | | |
|---|---|---|
| EP | 2050767 A1 | 4/2009 |
| EP | 2402376 A1 | 1/2012 |
| JP | H11240911 A | 9/1999 |
| JP | 2016135879 A | 7/2016 |
| JP | 6256494 B2 | 1/2018 |
| KR | 100533887 B1 | 12/2005 |
| KR | 100533889 B1 | 12/2005 |
| KR | 100981616 B1 | 9/2010 |
| KR | 100999551 B1 | 12/2010 |
| KR | 101055937 B1 | 8/2011 |
| WO | 9852686 A1 | 11/1998 |
| WO | 0023483 A1 | 4/2000 |
| WO | 0198381 A2 | 12/2001 |
| WO | 2008105546 A1 | 9/2008 |

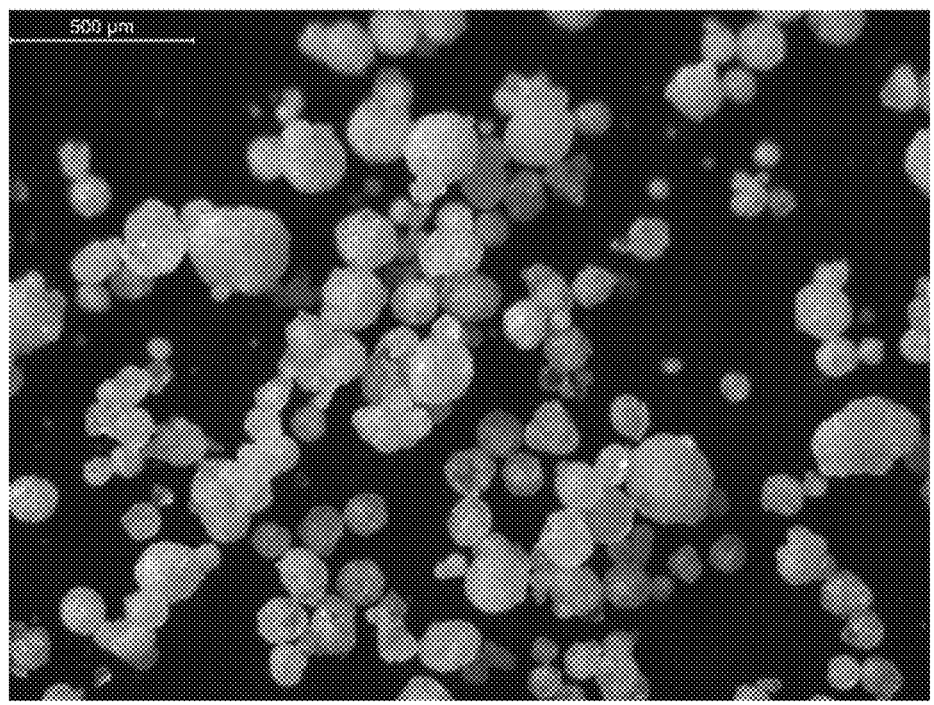
FIG. 10
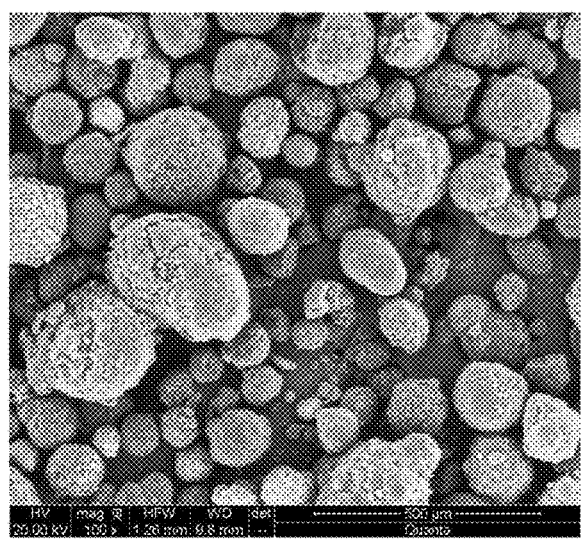 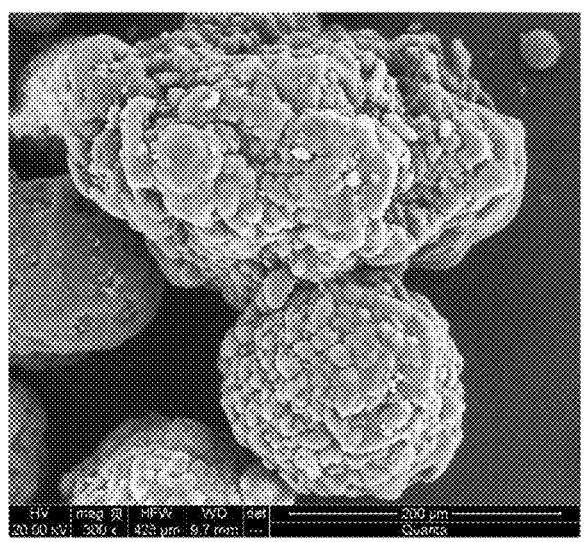
FIG. 11          FIG. 12

CONTINUOUS PROCESS FOR METALLOCENE PRELIMINARY POLYMERIZATION FOR GAS-PHASE POLYMERIZATION PROCESS

BACKGROUND

Polyethylene (PE) is synthesized via polymerizing ethylene ($CH_2=CH_2$) monomers and optionally a higher 1-olefin comonomer such as 1-butene, 1-hexene, 1-octene or 1-decene. PE can be generally classified into several types such as LDPE (Low-Density Polyethylene), LLDPE (Linear Low-Density Polyethylene), and HDPE (High-Density Polyethylene) depending upon the synthesis method. Each type of polyethylene has different properties and characteristics.

For polyolefins, such as PE polymers and/or co-polymers, the molecular weight distribution (MWD) of the polymer particles is one of the basic properties that determine the characteristics of the polymer resin, and thus its end-use applications. The MWD is the ratio of the weight average molecular weight M, to the number average molecular weight $M_n$ (MWD=$M_w/M_n$).

In a typical polymerization reaction, monomer, diluent, and a dry particulate catalyst are fed to a reactor where the monomer is polymerized. The diluent does not react but is typically utilized to control solids concentration. It also provides a convenient mechanism for introducing the catalyst into the reactor. The reactor effluent, a mixture of polymer, diluent and unreacted monomer, is removed from the reactor and fed to a flash tank where the polymer is separated from the diluent and unreacted monomer. Typically, catalyst will be contained in the polymer.

In general, for preparing catalyst slurry, a mixture of dry solid particulate catalyst and diluent are dispensed in a catalyst storage vessel for thorough mixing. Then, the catalyst slurry is transferred directly to a polymerization reaction vessel for contact with the monomer reactants, generally under high pressure conditions. However, it is important to control catalyst flow to a reactor as unexpected or uncontrolled catalyst injection in a reactor could lead to runaway reactions. Direct feeding of catalyst slurry from a storage vessel to a reactor has the disadvantage that the feeding rate of the catalyst to the reactor cannot be properly controlled. Such uncontrolled catalyst feeding may induce runaway reactions in the reactor.

Ethylene co-polymerization is the process wherein ethylene is polymerized with an olefin co-monomer, such as propylene, butene, hexene, etc. A major problem in such co-polymerization process is that the control of reaction parameters is very difficult. In particular, the ratio of co-monomer to monomer (ethylene) differs at different points in the reactor.

As a result of the variation in the co-monomer/ethylene ratio throughout the reactor, reaction conditions will vary along the path of the polymerization reactor. As ethylene is depleted faster than the co-monomer in the reactor, fluctuations in reaction temperatures and fluctuations in monomer concentration along the reactor occur. In addition, due to varying reaction conditions in the reactor, the polymerization reaction is sub-optimal and polymer particles will be obtained during the polymerization process with varying properties and a non-homogenous composition. In certain cases, due to the variation in the co-monomer/ethylene ratio throughout the reactor, polyethylene is produced having a low density, which could induce "swelling" of the polymer particles. Swelling refers to the process whereby formed polymer particles are dissolved in diluent, giving rise to polymer slurry, which is more viscous and may block the polymerization reactor.

Suitable catalysts for use in the production of polyolefins, and in particular for the preparation of polyethylene, may comprise chromium-type catalysts, Ziegler-Natta catalysts, and metallocene catalysts.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for preliminary polymerization that includes washing a catalyst mud comprising a supported metallocene catalyst with a solvent at a temperature from 0° C. to 40° C., a pressure from 20 to 40 kgf/cm², and a residence time of at least 30 minutes; continuously feeding the washed catalytic mud to a continuous pre-polymerization reactor; and pre-polymerizing, in the continuous pre-polymerization reactor, ethylene and at least one $C_4$ to $C_{10}$ α-olefin as comonomer, with the washed catalytic mud, in the presence of an inert diluent, to produce a pre-polymer.

In one aspect, embodiments disclosed herein relate to a process for preliminary polymerization that includes continuously feeding a catalytic composition comprising a supported metallocene catalyst and a solvent to a continuous pre-polymerization reactor; and pre-polymerizing, in the continuous pre-polymerization reactor, ethylene and at least one $C_4$ to $C_{10}$ α-olefin as comonomer, with the catalytic system, in the presence of an inert diluent, to produce a pre-polymer; wherein an average residence time in the continuous pre-polymerization reactor is more than 90 minutes and less than 240 minutes, a reactor temperature is from 10° C. to 50° C., and a reactor pressure is from 20 to 40 kgf/cm².

In another aspect, embodiments disclosed herein relate to a preliminary polymer composition obtained from a process for preliminary polymerization that includes washing a catalyst mud comprising a supported metallocene catalyst with a solvent at a temperature from 0° C. to 40° C., a pressure from 20 to 40 kgf/cm², and a residence time of at least 30 minutes; continuously feeding the washed catalytic mud to a continuous pre-polymerization reactor; and pre-polymerizing, in the continuous pre-polymerization reactor, ethylene and at least one $C_4$ to $C_{10}$ α-olefin as comonomer, with the washed catalytic mud, in the presence of an inert diluent, to produce a pre-polymer.

In another aspect, embodiments disclosed herein relate to a preliminary polymer composition obtained from a process for preliminary polymerization that includes continuously feeding a catalytic composition comprising a supported metallocene catalyst and a solvent to a continuous pre-polymerization reactor; and pre-polymerizing, in the continuous pre-polymerization reactor, ethylene and at least one $C_4$ to $C_{10}$ α-olefin as comonomer, with the catalytic system, in the presence of an inert diluent, to produce a pre-polymer; wherein an average residence time in the continuous pre-polymerization reactor is more than 90 minutes and less than 240 minutes, a reactor temperature is from 10° C. to 50° C., and a reactor pressure is from 20 to 40 kgf/cm².

In yet another aspect, embodiments disclosed herein relate to a preliminary polymer composition that includes a supported metallocene catalyst; and a preliminary polymer comprising a copolymer of ethylene and one or more $C_4$-$C_{10}$ α-olefin comonomers having a degree of comonomer incorporation ranging from 1 wt % to 9 wt %, preferably from 2 wt % to 4 wt %, relative to the copolymer, as measured by $^{13}C$ NMR.

Other aspects and advantages of this disclosure will be apparent from the following description made with reference to the accompanying drawings and the appended claims.

BRIEF DESCRIPTION OF DRAWINGS

FIG. 10 shows the results of Stereo Microscopy for the preliminary polymer of Example 4.

FIGS. 11 and 12 show the results of Scanning Electron Microscopy (SEM) for the preliminary polymer of Example 4.

DETAILED DESCRIPTION

Figure 1:
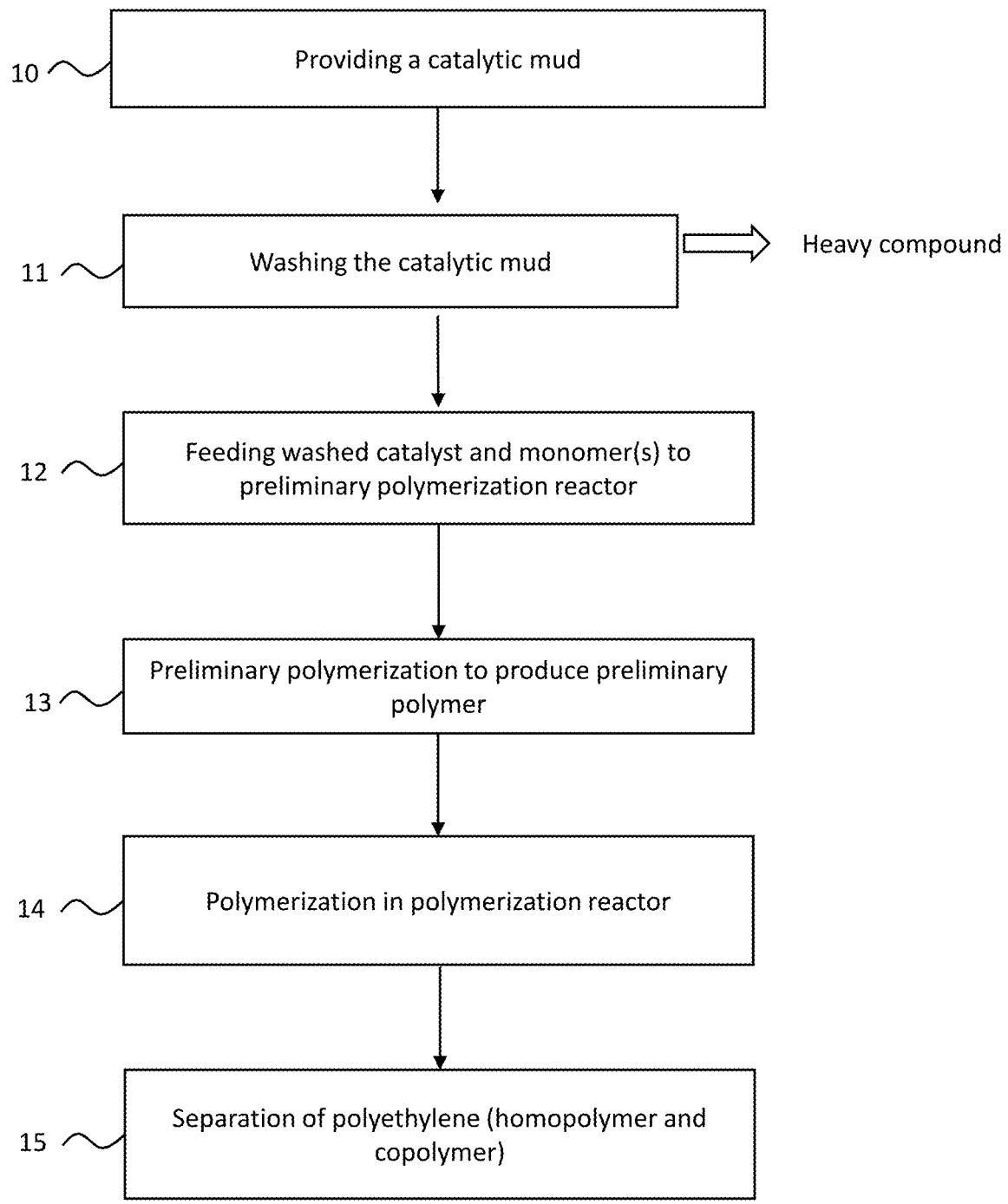
FIG. 1 depicts a process flow of one or more embodiments.

Embodiments disclosed herein relate to preliminary polymerization processes for polyethylene and the preliminary polymer compositions produced therefrom. In particular, embodiments described herein are directed to a continuous preliminary polymerization in a liquid phase that uses control of residence time and comonomer content that advantageously allows for the continuous production of preliminary polymers having desirable morphology, high bulk density, and a reduced quantity of polymer fines. Further, embodiments disclosed herein are particularly directed to polymerizations (and thus preliminary polymerizations) using a metallocene catalyst.

In general, catalysts allow for operating polymerization processes at milder conditions as they decrease the activation energy of the polymerization reaction. Metallocene/methylaluminoxane (MAO) catalysts enable the production of polymers with narrow molecular weight distribution, stereoregularity, and long-chain branched polymers due to the single active sites available on metallocene catalysts. However, metallocene/methylaluminoxane catalysts have a high initial activity. This high initial activity generally makes the control of the polymerization process difficult and results in fouling of the polymerization reactors. Indeed, the high initial activity generates polymer fines and polymer powder with a poor morphology that increases the generation of electrostatic charge, cover the reactor wall with polymers, and reduce the operability due to the formation of lumps and sheets inside the polymerization reactors. Thus, the present preliminary polymerization described herein seeks to overcome some of these concerns.

Generally, preliminary polymerization is a controlled process preceding a polymerization process. Preliminary polymerization is carried out under mild conditions, with lower monomer concentration and/or lower temperature, to reduce the polymerization rates in the initial stage. Advantages of preliminary polymerization may include: first, reduction or prevention of a thermal runaway of highly active primary catalyst particles, which may result in an overly rapid deactivation of the catalyst and poor morphology. Second, preliminary polymerization may allow the primary catalyst particles to disintegrate into fragments in a controlled way, such that the original particle shape is retained, as compared to fast growth rate of the primary particles which leads to a sudden breakup into undesired fines particles. Third, when using external activation, preliminary polymerization gives the associated catalyst components time to diffuse into the core of the primary catalyst particles, to form active centers at all potential active sites, whereas when reaction rates are too high in the first seconds of the reaction, a polymer shell might encapsulate the catalyst before it has been completely activated by the co-catalyst.

Embodiments disclosed herein generally relate to polyolefins polymerization using metallocene catalyst. As mentioned above, the introduction of a preliminary polymerization step reduces the metallocene catalyst initial activity and consequently reduces the generation of polyolefins fines and produces a polymer powder with a good morphology. This preliminary polymerization step may serve to reduce and/or eliminate the formation of lumps and sheets inside a fluidized bed gas-phase polymerization reactor used for ethylene polymerization for instance. This may increase the time the reactor can be operated between cleaning and therefore increases productivity.

Referring now to FIG. 1, a process flow for embodiments of the present disclosure is shown. In stage 10, a catalytic mud is provided. The catalytic mud may have been previously prepared by mixing a metallocene catalyst supported on silica with mineral oil, grease, wax and/or paraffin to form a suspension of catalyst. In stage 11, the catalytic mud is washed using $C_3$-$C_7$ saturated hydrocarbon to remove the heavier hydrocarbons (i.e., mineral oil, grease, wax and/or paraffin) in the mud. In stage 12, the washed catalytic mud is continuously fed with a monomer, such as ethylene, and an optional co-monomer, such as $C_4$-$C_{10}$ olefin, into a preliminary polymerization reactor for preliminary polymerization to occur. In stage 13, the preliminary polymerization produces a preliminary polymer, such as polyethylene. In stage 14, the preliminary polymer is pumped continuously into a polymerization reactor in which polymerization occurs to produce polyolefins, such as polyethylene (homopolymer and copolymer). In stage 15, the homopolymer and copolymer of polyethylene produced in the polymerization are separated from the diluent and the reactants. Each of these stages will be discussed in turn.

Providing a Catalytic Mud

One or more embodiments disclosed herein may include providing, or optionally preparing, a catalytic mud for preliminary polymerization. The catalyst mud may include a supported metallocene catalyst mixed with at least one $C_{18}$-$C_{50}$ saturated hydrocarbon to form a stable suspension having a concentration of catalyst in the mud ranging from 15 to 50 wt %. For example, the $C_{18}$-$C_{50}$ saturated hydrocarbon may be mineral oil, grease, wax, or paraffin, or a combination thereof.

Generally, the present disclosure may use any metallocene catalyst; however, one or more embodiments may use a metallocene catalyst containing a transition metal complex of group 4 or 5 of the periodic table, with or without bridge between the aromatic rings, immobilized on an inorganic support, such as a silica support, and containing an alkyl-aluminium activator compound and/or a fluorinated activator. Each of these components will be discussed in turn.

The transition metal base metallocene of groups 4 or 5 of the periodic table is derived from a compound of formula I:

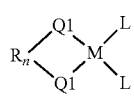

(I)

where M is a transition metal of groups 4 or 5;
L, which may be the same or different, comprises halogen radical, aryl radical, alkyl radical containing from 1 to 5 carbon atoms, or alkoxy radical containing from 1 to 5 carbon atoms;
Q is a bulky ligand, such as cyclopentadienyl, indenyl or fluorenyl type, substituted or not by hydrogen, alkyl, cycloalkyl, aryl, alkenyl, arylalkyl, arylalkyl or arylalkenyl, coordinated to metal M;
R is a bridging group between the bulky ligands Q; and
n may range from 0 to 4, wherein when n is equal to 1 (or more), the metallocene has a bridge R between the bulky ligands Q, and when n is equal to zero, the metallocene does not have the bridge R.

In one or more embodiments, M, the transition metal content of group 4 or 5 of the periodic table in the metallocene catalyst, may range from 0.1 to 20 wt % of the supported catalyst.

Representative but non-limiting examples of compounds having the formula I include: bis(cyclopentadienyl)zirconium dimethyl, bis(cyclopentadienyl)zirconium dichloride, bis(dimethylcyclopentadienyl)zirconium dichloride, bis(m-ethylethylcyclopentadienyl)zirconium dichloride, bis(methyl-n-propylcyclopentadienyl)zirconium dichloride, bis(methyl-n-butylcyclopentadienyl)zirconium dichloride, bis(cyclopentadienyl)zirconium monomethylmonochloride, bis(cyclopentadienyl)titanium dichloride, bis(cyclopentadienyl)titanium difluoride, cyclopentadienylzirconium tri-(2-ethylhexanoate), bis(cyclopentadienyl)zirconium hydrogen chloride, bis(cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, (η5-indenyl)hafnium trichloride, racemic dimethylsilanylene-bis(4,7-dimethyl-1-indenyl)zirconium dichloride, racemic dimethylsilanylene-bis(indenyl)uranium dichloride, racemic dimethylsilanylene-bis(2,3,5-trimethyl-1-cyclopentadienyl) zirconium dichloride, racemic dimethylsilanylene(3-methylcyclopentadienyl)hafnium dichloride, racemic dimethylsilanylene-bis(1-(2-methyl-4-ethylindenyl) zirconium dichloride; racemic dimethylsilanylene-bis(2-methyl-4,5,6,7-tetrahydro-1-indenyl)zirconium dichloride, bis(pentamethylcyclopentadienyl)thorium dichloride, bis(pentamethylcyclopentadienyl)uranium dichloride, (tert-butylamide)dimethyl(tetramethyl-η5-cyclopentadienyl)silanetitanium dichloride, (tert-butylamide)dimethyl(tetramethyl-η5-cyclopentadienyl)silanechromium dichloride, (tert-butylamide)dimethyl(-η5-cyclopentadienyl)silanetitanium dichloride, (tert-butylamide)(tetramethyl-η5-cyclopentadienyl)-1,2-ethanediyluranium dichloride, (tert-butylamide)(tetramethyl-η5-cyclopentadienyl)-1,2-ethanediyltitanium dichloride, (methylamido)(tetramethyl-η5-cyclopentadienyl)-1,2-ethanediylcerium dichloride, (methylamido)(tetramethyl-η5-cyclopentadienyl) 1,2-ethanediyltitanium dichloride, (ethylamido)(tetramethyl-η5-cyclopentadienyl) methylenetitanium dichloride, (tert-butylamide)dibenzyl(tetramethyl-η5-cyclopentadienyl)silanebenzylvanadium chloride, (benzylamido)dimethyl(indenyl)silanetitanium dichloride, and (phenylphosphido)dimethyl(tetramethyl-η5-cyclopentadienyl)silanebenzyl-titanium chloride, racemic [1,1'-dimethylsilanylene-bis(3-methylcyclopentadienyl)] zirconium dichloride; [1,1'-dimethylsilanylene-bis(indenyl)] zirconium dichloride; [1,1'-dimethylsilanylene-bis(4,5,6,7-tetrahydroindenyl)] zirconium dichloride; [1,1'-(1,1,2,2-tetramethyldisilanylene)-bis(3-methylcyclopentadienyl)] zirconium dichloride; [1,1'-(1,1,2,2-tetramethyldisilanylene)-bis(4,5,6,7-tetrahydroindenyl)] zirconium dichloride; [1,1'-dimethylsilanylene-bis(3-trimethylsilanylcyclopentadieny)] zirconium dichloride; [1,1'-(1,1,2,2-tetramethyldisilanylene)-bis(3trimethylsilanylcyclopentadienyl)] zirconium dichloride; [1,1'-(1,1,3,3-tetramethyldisiloxanylene)-bis(4,5,6,7-tetrahydroindenyl)] zirconium dichloride; [1,1'-(1,1,4,4-tetramethyl-1,4-disilanylbutylene)-bis(4,5,6,7-tetrahydroindenyl)] zirconium dichloride; [1,1'-(2,2-dimethyl-2-silapropylene)-bis(3-methylcyclopentadienyl)] zirconium dichloride.

The metallocene catalyst may be supported on an inorganic compound, such as an inorganic oxide. Examples of inorganic oxides may include silica, alumina, magnesia, mixed oxides of silica-alumina, silica-magnesia, alumina-magnesia, and silica-magnesium chloride, any of which may be optionally modified. One of the main advantages of a catalyst support is to preserve the advantages of homogeneous catalyst in terms of high activity and control of polymer microstructure, while providing an acceptable morphology of the polymer particles to avoid reactor fouling.

One or more embodiments may include a micro spherical silica, particularly a porous silica, as metallocene catalyst support. The micro spherical silica may have an average particle size ranging from a lower limit of any of 10, 15, or 20 μm, to an upper limit of any of 80, 100, or 120 μm, where any lower limit and upper limit may be used in combination. The silica may have a $SiO_2$ content above 90% by weight. The silica may have a surface area ranging from a lower limit of any of 200, 225, or 250 $m^2/g$, to an upper limit of 300, 400, or 500 $m^2/g$, where any lower limit may be used in combination with any upper limit. The silica may have a pore volume ranging from a lower limit of 0.5 mL/g to an upper limit of 2.0 or 2.5 mL/g. The silica may have an average pore diameter ranging from a lower limit of 10, 15, or 20 nm to an upper limit of any of 30, 35, or 40 nm, where any lower limit may be used in combination with any upper limit. The silica may have a bulk density ranging from a lower limit of 0.25 or 0.3 g/mL, to an upper limit of 0.35 or 0.4 g/mL, where any lower limit can be used in combination with any upper limit. The silica may have an apparent density ranging from a lower limit of any of 1.5, 1.6, or 1.7 g/mL, to an upper limit of any of 2.0, 2.25, or 2.5 g/mL, where any lower limit can be used in combination with any upper limit.

One or more embodiments may include a metal-containing compound of groups 2, 6, 12, or 13 of the periodic table on the surface of the silica. Representative, but not limiting, examples of the metal containing compound of groups 2, 6, 12, or 13 of the periodic table include $MgCl_2$, $MgF_2$, $(MoCl_5)_2$, $ZnCl_2$ and $AlCl_3$. The content of such metal-containing compound on the surface of the silica may range from 0.1 to 20 wt % of the supported catalyst.

As mentioned above, one or more embodiments of the metallocene catalyst may include either an alkylaluminum activator or a fluorinated activator. Non-limiting examples of alkylaluminum activators include trimethylaluminum (TMAL), triethylaluminum (TEAL), triisobutylaluminum (TIBAL), tri-n-hexylaluminum (TNHAL), tri-dimethylaluminum chloride (DMAC), methyl aluminum dichloride (MADC), diethylaluminum chloride (DEAC), ethylaluminum dichloride (EADC), diisobutylaluminum chloride (DIBAC), isobutylaluminum dichloride (MONIBAC), methylaluminoxane (MAO). The amount of alkylaluminum activator that may be used ranges between 0.1 and 40% by weight of aluminum in relation to the silica support.

Non-limiting examples of fluorinated activator compounds include: HF, $MgF_2$, $(NH_4)_3AlF_6$, $NH_4HF_2$, NaF, KF, $NH_4F$, $(NH_4)_2SiF_6$. The amount of fluorinated activator that may be used is from 0.1% to 20% by weight of fluorine relative to the silica support, such as from 2% to 10%.

Generally, the catalyst system may be prepared by reacting the activator with either the support or the metallocene, followed by reacting the product with the other of the support or metallocene. In one or more particular embodiments, the catalyst system preparation may include the following three steps:
1) Reaction of the silica support with a solution of alkylaluminum activator compound in an inert organic solvent and/or with a fluorinated activator in acid solvent or mixture of acidic or gas phase solvents to impregnate the silica support with the activator in solvent.
2) Reaction of the product obtained in (1) with a transition metal base metallocene solution of groups 4 or 5 of the periodic table in an inert organic solvent, and
3) Washing of and solvent removal from the reaction product obtained in (2).

Non-limiting examples of inert organic solvents, which may be used for solubilizing the alkylaluminum activator or solubilizing the metallocene, are toluene, cyclohexane, n-hexane, n-heptane, n-octane and/or mixtures thereof.

Non-limiting examples of acidic solvents that may be used for solubilizing the fluorinated activator compound are nitric acid ($HNO_3$), hydrochloric acid (HCl), and sulfuric acid ($H_2SO_4$). They may be used neat or mixed, in their concentrated forms, or as aqueous solutions in any proportions.

The amount of transition metal which may be used in the preparation of the metallocene may range from 0.1 to 20 wt % of metal relative to the silica support, or from 0.1 to 2% in more particular embodiments.

The reaction time of step (1) may range from a lower limit of any of 0.1 h or 0.5 h to an upper limit of 6 h or 24 h, where any lower limit can be used in combination with any upper limit. The reaction temperature of step (1) may range from a lower limit of any of −10° C. or 30° C. to an upper limit of any of 80° C. or 90° C., where any lower limit can be used in combination with any upper limit.

The reaction time of step (2) may range from a lower limit of 0.1 h or 0.5 h to an upper limit of any of 4 h or 24 h, where any lower limit can be used in combination with any upper limit. The reaction temperature of step (2) may range from a lower limit of any of 0° C. or 10° C. to an upper limit of any of 30° C. or 60° C., where any lower limit can be used in combination with any upper limit.

Step (3) of the process for obtaining the supported metallocene catalysts includes washing and removing the solvent contained in the reaction product obtained in (2) under reduced pressure or with the use of nitrogen gas flow. The washing may be performed with an organic solvent using a wash temperature ranging from room temperature to 90° C.

Following the preparation, the resulting supported metallocene catalyst may have an average particle size ranging from a lower limit of any of 10, 15, or 20 μm, to an upper limit of any of 80, 100, or 120 μm, where any lower limit and upper limit may be used in combination. In particular embodiments, the supported metallocene catalyst may have a d50 ranging from 35 μm to 55 μm and a d10 ranging from 14 μm to 34 μm. Generally, any reference herein, unless otherwise noted, to a supported metallocene catalyst refers to the supported metallocene catalyst in dry form, prior to preparation of any catalytic mud.

In one or more embodiments, the supported metallocene catalyst may have a surface area ranging from a lower limit of any of 200, 225, or 250 $m^2/g$, to an upper limit of 250, 275, or 300 $m^2/g$, where any lower limit may be used in combination with any upper limit. In one or more embodiments, the supported metallocene catalyst may have a pore volume ranging from 0.5 to 2.0 ml/g. In one or more embodiments, the supported metallocene catalyst may have a bulk density ranging from a lower limit of 0.2, 0.25, 0.3, or 0.39 g/ml, to an upper limit of 0.4, 0.45 or 0.5 g/ml, where any lower limit can be used in combination with any upper limit. In one or more embodiments, the supported metallocene catalyst may have an apparent density ranging from a lower limit of any of 1.5, 1.6, or 1.7 g/ml, to an upper limit of any of 2.0, 2.25, or 2.5 g/ml, where any lower limit can be used in combination with any upper limit.

In one or more embodiments, the supported metallocene catalyst may have a total intrusion volume less than or equal to 1 mL/g, a total pore area less than or equal to 10 $m^2/g$, and an apparent skeletal density of 1.5 to 2.5 g/mL.

In one or more embodiments, the supported metallocene catalyst is provided as a catalyst mud and thus suspended in a carrier of a $C_{18}$-$C_{50}$ saturated hydrocarbon such as mineral oil, grease, wax, or paraffin, or a combination thereof for easy transfer to a preliminary polymerization reactor. However, it is also envisioned that a catalyst in dry form may be used, without forming a catalytic mud. In accordance with embodiments of the present disclosure using a catalytic mud, the catalytic mud is first washed.

Washing the Catalytic Mud

As mentioned above, a catalyst mud includes from 15 wt % to 50 wt % of catalyst suspended in a carrier of a $C_{18}$-$C_{50}$ saturated hydrocarbon such as mineral oil, grease, wax, or paraffin, or a combination thereof generally for easy transfer to a reactor. In accordance with the present disclosure, washing may be performed to remove heavier hydrocarbons improve the insertion of monomers, such as ethylene, and comonomers, such as $C_4$ to $C_{10}$ α-olefin, into the active sites of the metallocene catalyst in subsequent steps.

In one or more embodiments, the mud is transferred to a first reactor such as continuous stirred tank reactor (CSTR), tubular reactor or loop reactor, in which the wash of the catalytic mud occurs. The catalyst mud may be washed using a solvent such as a saturated hydrocarbon (for example, selected from propane, butane, iso-butane, pentane, iso-pentane, hexane, heptane and combinations thereof) at a temperature from 0° C. to 40° C., a pressure from 20 kgf/cm$^2$ to 40 kgf/cm$^2$, and for at least 30 minutes. In one or more embodiments, the wash temperature may have a lower limit of any of 0° C., 10° C., or 20° C., and an upper limit of any of 30° C. or 40° C., where any lower limit can be used in combination with any upper limit. The catalytic mud may be washed using from 1 kg to 10 kg of solvent per gram of supported metallocene catalyst free of mineral oil, grease, wax, or paraffin (i.e., considering the amount of supported metallocene catalyst without the mineral oil, grease, wax, or paraffin, as if it were in dry form). In one or more embodiments, washing may be performed in presence of at least one of the alkylaluminum compounds mentioned above that can act as poison scavenger of $C_3$-$C_7$ saturated hydrocarbons in the preliminary polymerization step.

After washing the catalytic mud to remove mineral oil, grease, wax, or paraffin, the supported metallocene catalyst may still have some of these compounds in its pores. The washing step may reduce the amount of heavier hydrocarbons by up to 60 wt %, such as from 30 to 60 wt %. Following washing, the washed supported metallocene catalyst may have an average particle size ranging from 10 to 120 μm, a total pore area less than or equal to 100 m$^2$/g, a pore volume ranging from 0.5 and 2.0 ml/g, a bulk density ranging from 0.50 to 1.0 g/ml (such as between 0.60 and 0.80 g/ml), and an apparent density ranging from 1.5 to 2.5 g/ml (such as between 1.7 to 2.0 g/ml).

Preliminary Polymerization

One or more embodiments include continuously feeding the washed catalytic mud or a catalytic composition into a continuously operating preliminary polymerization reactor with ethylene and at least one $C_4$ to $C_{10}$ α-olefin as comonomer, to produce a pre-polymer. In embodiments using a catalytic composition, such a catalytic composition may be formed by diluting a dry catalyst with a solvent so that it may be added to the reactor as a slurry. As used herein, a catalytic composition includes a catalyst (such as the supported metallocene catalyst) and a solvent. In one or more embodiments, the solvent may be a saturated hydrocarbon, for example, selected from propane, butane, iso-butane, pentane, iso-pentane, hexane, heptane and combinations thereof.

The preliminary polymerization may be carried out in the liquid phase in a reactor selected from a tubular reactor, a continuous stirred tank reactor (CSTR), or a loop reactor.

The presence of comonomer in the reaction media may increase the observed reaction speed, lead to higher productivity, and facilitate the fragmentation of the support during particle growth. The comonomer may be selected from the group consisting of 1-butene, 1-pentene, 1-hexene, 1-heptene, 1-octene, and 1-decene. In particular embodiments, 1-hexene may be the comonomer. The $C_4$ to $C_{10}$ α-olefin comonomer may increase the amorphous content, give more elasticity to the polyethylene particle and give better resistance to particle breakage during the polymerization process.

In the case of homo preliminary polymerization of ethylene, there can be an uncontrolled initial evolution of the support fragmentation process, resulting in polymer particle surfaces with a high roughness and a deformed morphology. The addition of $C_4$-$C_{10}$ α-olefins comonomers in the reaction may result in a more polished polymer particle surface and a better morphology. This addition may also facilitate the fragmentation of the support during particle growth and improve productivity. The rapid monomer consumption in the catalyst particles may create a convective mass transport of ethylene and comonomer into the catalyst particles, where the higher reactivity of ethylene may create an accumulation of comonomer at the active sites. The introduction of higher α-olefin as comonomer may reduce the crystallinity of the polyethylene produced and lead to a better catalyst breakup. Lower crystallinity may reduce active-site blockage and/or increase rates of monomer diffusion and lead to higher concentrations of ethylene dissolved in the amorphous polymer near the active sites. However, the reduction in polymer crystallinity may increase the occurrence of sticky particles.

As $C_4$-$C_{10}$ α-olefin comonomers are partially converted into preliminary polymers, a significant amount of $C_4$-$C_{10}$ α-olefin is transferred from the preliminary polymerization to the polymerization reactor. Thus, it may be desirable to limit the amount of unreacted comonomer that could be transferred from the preliminary polymerization reactor to the polymerization reactor to avoid a high comonomer concentration zone inside the polymerization reactor and, thus, higher temperature points, which may cause the formation of sticky particles that adhere to the reactor inner walls and form agglomerates.

Therefore, in one or more embodiments, the $C_4$ to $C_{10}$ α-olefin comonomer content may range from 1 wt % to 7 wt % based on the total amount of pre-polymer inside the preliminary polymerization reactor to prevent the occurrence of sticky particles. For example, the $C_4$ to $C_{10}$ α-olefin comonomer content may range from a lower limit of any of 1 or 2% to an upper limit of any of 4, 5, or 7%, where any lower limit can be used in combination with any upper limit. In addition, a comonomer/ethylene mass ratio fed into the continuous pre-polymerization reactor may range from 0.1 to 1.2.

One or more embodiments may include an ethylene/supported metallocene catalyst mass ratio fed into the continuous pre-polymerization reactor ranging from 5 to 150. As noted above, reference to the supported metallocene catalyst refers to the supported metallocene catalyst without any mineral oil, grease, wax, or paraffin, i.e., in dry form prior to preparing any catalytic mud, if used.

An amount of hydrogen may be present in the continuous pre-polymerization reactor in a range from 0 to 0.05 gram of hydrogen per kilogram of ethylene. Hydrogen may be used in the preliminary polymerization step as transfer control agent to reduce the preliminary polymer molecular weight, as well as to promote the activation of the catalyst.

In one or more embodiments, the preliminary polymerization may be conducted in a liquid phase using inert diluents such as $C_3$-$C_7$ saturated hydrocarbons. The amount of diluent used may be adjusted to suit the different conditions of the process.

One or more embodiments may include a preliminary polymerization carried out in presence of an antistatic agent in the range of 1 wppm to 10 wppm based on the total amount of monomer, comonomer, and inert diluent present in the pre-polymerization reactor.

The continuous preliminary polymerization described above may have an average residence time in the reactor of more than 90 minutes and less than 240 minutes. The average residence time is related to the time available for the formation of preliminary polymer on the catalyst particles. Whereas batch preliminary polymerizations have residence times in between 30 minutes and 90 minutes, the present continuous polymerization may have a longer residence time. With a longer residence time, the diffusion phenomenon may occur more effectively, allowing the monomer and comonomer particles to reach more active sites of the catalyst. A longer residence time, associated with milder conditions of polymerization, may allow the formation of particles with better morphology. Therefore, the presently described continuous preliminary polymerization may produce polymers with excellent morphology and high bulk density that reduce the amount of fines polymer particles and fouling in the polymerization reactors.

In one or more embodiments, the temperature in the preliminary polymerization may range from 10° C. to 50° C., and a pressure from 20 to 40 kgf/cm$^2$. In particular embodiments, the reactor temperature may be greater than 25° C., such as from 25° C. to 50° C.

The continuous preliminary polymerization described above have major advantages over batch preliminary polymerization. For instance, batch preliminary polymerization requires additional reactor equipment, more solvents, and more monomers. Specifically, batch preliminary polymerization requires a solvent recovery system, leading to higher process costs and labor requirement. In contrast with batch preliminary polymerization processes, the continuous preliminary polymerization described above does not need to recover solvents and store the product of the preliminary polymerization step. Therefore, the continuous process is simpler, more stable, and more affordable.

The polymerization degree of the pre-polymerized metallocene-based catalyst system may be less than 60 grams of polyolefin per gram of supported metallocene catalyst. For example, the polymerization degree may be from 5 to 55 grams of polyolefin per gram of supported metallocene catalyst. As noted above, reference to the supported metallocene catalyst refers to the supported metallocene catalyst without any mineral oil, grease, wax, or paraffin, i.e., in dry form prior to preparing any catalytic mud, if used.

The total amount of polymer (such as polyethylene) produced in the preliminary polymerization may be 1 wt % or less, such as less than 0.75 wt %, relative to a total amount of polymer formed in a subsequent polymerization reactor.

Preliminary Polymer

The preliminary polymerization described herein may produce a preliminary polymer composition comprising an ethylene copolymer that includes ethylene and one or more $C_4$-$C_{10}$ α-olefin comonomer. In one or more embodiments, the degree of comonomer incorporation may range from 1 wt % to 9 wt % relative to the copolymer, as measured by $^{13}$C NMR. For example, the degree of comonomer incorporation may range from a lower limit of any of 1 wt % or 2 wt % to an upper limit of any of 4 wt %, 7 wt %, or 9 wt %, relative to the copolymer, where any lower limit can be used in combination with any upper limit.

One or more embodiments may produce a preliminary polymer with a polymerization degree of less than 60 g of polymer per gram of catalyst. For example, the polymerization degree of the pre-polymerized polymer may be from 5 to 55 g of polymer per gram of catalyst. In one or more embodiments, an d50 of the pre-polymer may be from 50 μm to 200 μm and a d10 may be from 30 μm to 130 μm.

In one or more embodiments, a number average molecular weight (Mn) of the pre-polymer may range from 20 kDa to 120 kDa. In one or more embodiments, the preliminary polymer may have a weight average molecular weight (Mw) ranging from about 120 kDa to 400 kDa and a molecular weight distribution (MWD: $M_w/M_n$) from 2.0 to 5.0 (such as from 2.0 to 3.0), as measured by Gel Permeation Chromatography according to ISO 1601 4-4:2003 and ASTM D 6474-99.

In one or more embodiments a preliminary polymer may have a melting temperature ($T_m$) ranging from about 100° C. to 130° C.

One or more embodiments may include producing a preliminary polymer composition with a homogeneous short chain branching distribution with an angular coefficient b that ranges from −5 to 5 over a molecular weight (M) range of log(M) of 3.5 to 6.0, where the angular coefficient b is provided by a linear regression of the curve obtained by plotting short chain branches per 1000 total carbons atoms (SCB/1000TC) vs. log(M) according to equation (SCB/1000TC)=b*log(M)+a, where a is a linear coefficient.

A smaller value of b means a more substantially constant distribution of short chain branches per 1000 total carbons over the molecular weight distribution, i.e., each molecular weight fraction from the low molecular weight end to the high molecular weight end have almost the same amount of short chain branches per 1000 total carbons. Over the log(M) range of 3.5 to 6.0 the value of b may range from a lower limit of any of 0, −1, −3, −5, and −10 to an upper limit of any of 0, 1, 3, 5, and 10 where any lower limit can be used with any mathematically-compatible upper limit. The value of b may even be approximately 0.

Polymerization

The preliminary polymer described herein may then be continuously fed to a polymerization reactor. The polymerization step may be carried out in a gas phase reactor or liquid phase reactor, optionally in the presence of $C_4$-$C_{10}$ alpha-olefin comonomers, to form polyethylene homopolymer or copolymer.

In one or more embodiments, the polymerization may occur in a gas phase reactor, resulting in a polymer with good morphology and high bulk density, avoiding the formation of fouling and decreasing the fines polymer particles generation.

In one or more embodiments, the amount of unreacted comonomer transferred from the preliminary polymerization reactor to the polymerization reactor with the preliminary polymer may be less than 10 wt % or even less than 5 wt % of the total amount of comonomer fed to the polymerization reactor. Thus, it is envisioned that fresh comonomer is fed to the polymerization reactor.

EXAMPLES

Test Methods

Unless otherwise specified, the values reported herein were determined according to the following test methods.

Bulk density: Polymer bulk densities were obtained according to ASTM D1895B.

Total Intrusion Volume and Total Pore Area are measured according to BET and BJH methods. The samples were previously degassed (10-2 mbar) at 85° C. for 16 h. Nitrogen adsorption and desorption isotherms were measured at −196° C. on a TriStar II 3020 V1.03 (Micromeritics). The Total Pore Area was determined by the Brunnauer-Emmett- Teller equation (BET method) in the range of P/P0=0.05-0.35. Mesopores sizes and their distributions were calculated using the Barrett-Joyner-Halenda equation (BJH method) using Halsey standards. Micropore volumes were calculated using the t-plot method, using the Harkins and Jura isotherm.

Polymer Molecular Weight Distribution (MWD=Mw/Mn), Mw, Mn and Brach content and Short Chain Branching (SCB) are measured according to the following methods by Gel Permeation Chromatography (GPC) according to ISO 1601 4-4:2003 and ASTM D 6474-99. A Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a mercury cadmium telluride (MCT) detector. The MCT detector is cooled with liquid nitrogen. During the chromatographic run a series of FTIR spectra is collected using the Perkin Elmer TimeBase V3.0 Software. The spectrometer settings were 16 accumulations, scan range from 3000 cm to 2700 cm, resolution 8 $cm^{-1}$. A background spectrum taken under GPC run conditions is subtracted from each spectrum collected during the chromatographic run. 423.5 LL of Sample solution were injected per analysis. The column set was calibrated using universal calibration (according to ISO 16014-2:2003) with at least 15 narrow MWD polystyrene (PS) standards in the range of 0.6 kg/mol to 6000 kg/mol. Mark Houwink constants for PS, PE and PP used are as per ASTM D 6474-99. All samples were prepared by dissolving 4.0-8.0 mg of polymer in 4 mL (at 140° C.) of stabilized TCB (stabilized with 250 mg/L of butylated hydroxytoluene—BHT) and keeping for max 3 hours at max 160° C. with continuously gentle shaking prior sampling into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software.

Comonomer incorporation (incorporated 1-hexene content—$C_6$) was determined by $^{13}C$ NMR spectroscopy. Polymers (200 mg) were dissolved in a solvent blend of deuterated tetrachloroethylene and 1,2 dichlorobenzene (25 to 75% v/v) under heating in 10 mm tube. The spectra were recorded with a Bruker AVANCE III HD spectrometer operating at 125 MHz for $^{13}C$ ($^1H$ 500 MHz) at 120° C., using a dual C—H He cooled 10 mm probe. $^{13}C$ spectra were recorded under the following operating conditions: zgpg30 sequence (with nuclear Overhauser enhancement), acquisition time 2.5 s, relaxation delay 10 s, 1024 scans. Residual carbon S6+6+($\delta$ 30.00 ppm) of polyethylene were used as internal reference for $^{13}C$ NMR spectra, respectively. $^{13}C$ NMR comonomer content and distributions were determined according by the methodology proposed by J. C. Randall et al that provides general methods of polymer analysis by NMR spectroscopy. (RANDALL, 1989, 1973).

Melt Flow Rate is measured according to ASTM D-1238, condition 190° C./2.16 kg (formerly known as "Condition (E)" and also known as I2).

Melt Temperature ($T_m$) is measured by Differential Scanning Calorimetry (DSC). DSC analyses were performed with Mettler Toledo DSC 1 system equipped with an autosampler and a 120 thermocouple sensor. The temperature and the heat flow of the equipment were calibrated with an indium standard. All samples were accurately weighed (6±0.1 mg) and sealed in aluminum pans. An empty aluminum pan was employed as the reference. Dry nitrogen with a flow rate set at 50 mL $min^{-1}$ was used as the purging gas. The STARe thermal analysis software was used to process the collected data. Melting peak temperature ($T_m$) was defined as the temperature corresponding to the melting peak point; the crystallinity (by weight, wc) of the samples was calculated through wc=$\Delta$Hf/$\Delta$Hf0, where $\Delta$Hf (J $g^{-1}$) is the melting enthalpy of the sample and $\Delta$Hf0 (293 J $g^{-1}$) is the melting enthalpy of a 100% crystalline polyethylene. Conventional DSC method: Samples were heated to 180° C. to erase thermal history and then cooled to −20° C. before being heated to 180° C. Heating rate 10° C. $min^{-1}$, cooling rate −10° C. $min^{-1}$.

Scanned Electron Microscopy (SEM) analysis were recorded on a Phenom ProX Microscope following ASTM E1508 guidelines.

Optical Microscopy: Polymer microscopy were obtained on a Leica M205 C microscope.

Particle size was measured using a Malvern Mastersizer 2000 laser particle size analyzer with a Hydro 2000S pump accessory (Malvern Instruments Ltd., Worcestershire, UK). Iso-paraffin was used as the dispersant. 150 mL of iso-paraffin was added to the glass vial and enough polymer sample is added as indicates by the equipment. software. The polymer suspension was then continuously stirred by a turbine, spinning at 2000 rpm, on the laser diffraction unit. The Malvern Mastersizer continuously pumps a portion of this suspension through a gap between two glass lenses, or windows. The size of the particles passing between the lenses is measured by the scattering pattern of the laser, as it diffracts off of the particles, by application of the Fraunhofer model, and using Mie theory.

Comparative Example 1: Preparation of Ethylene Preliminary Polymer without Comonomer Using Dried Supported Metallocene Catalyst 35.7 grams of preliminary polymer was prepared by polymerizing ethylene using a metallocene-based catalyst supported on silica. The reaction was carried out in a 3.5 L bench reactor, which was purged with nitrogen flow at 70° C. for 2 hours prior the preliminary polymerization reaction. The catalytic system was prepared using the dried metallocene-based catalyst which was pre-contacted with a 10% solution of Triisobuthylaluminum (TIBAL) in hexane. After 5 min of the pre-contact reaction, the catalytic system was transferred to the reactor under nitrogen flow. Propane was used as inert diluent. At the end of the reaction time, the polymerization reaction was interrupted by injection of carbon dioxide ($CO_2$). The process conditions are in Table 1 and the results of the preliminary polymer characteristics are in Table 7. The results of Optical Microscopy, Scanning Electron Microscopy (SEM) and Malvern of the preliminary polymer are represented in FIG. 2, FIGS. 3 and 4 and FIG. 5, respectively.

TABLE 1

Preliminary Polymerization Process
Conditions of Comparative Example 1

| | |
|---|---|
| Temperature [° C.] | 30 |
| Residence time [minutes] | 60 |
| Ethylene/Catalyst [wt ratio] | 50 |
| Comonomer/ethylene [wt ratio] | 0 |
| Hydrogen/ethylene [wt ratio] | 0 |
| Catalyst [g] | 1.0 |

TABLE 1-continued

Preliminary Polymerization Process
Conditions of Comparative Example 1

| | |
|---|---|
| TIBAL [g] | 0.3 |
| Propane [g] | 782 |

Figure 2:
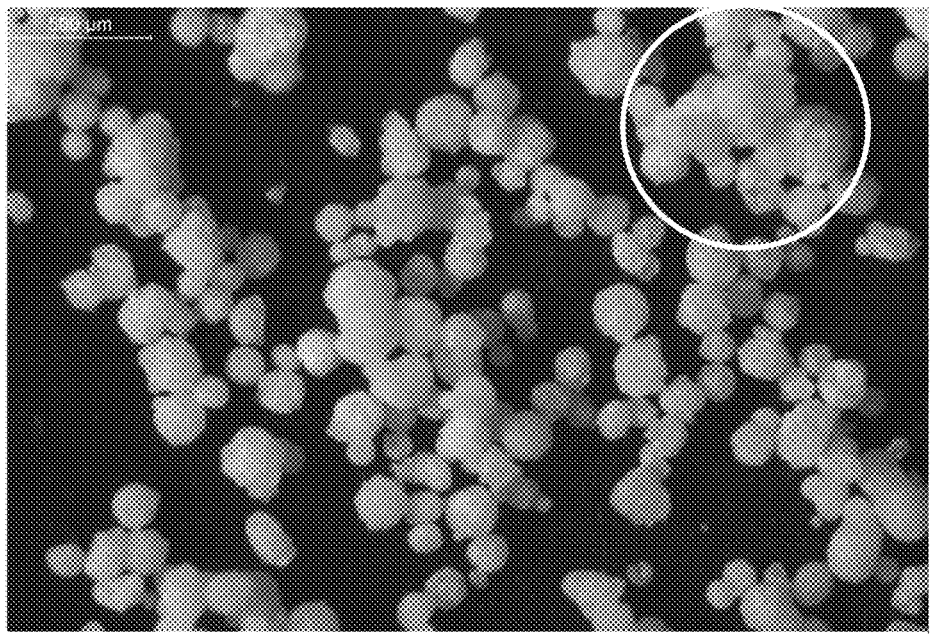
FIG. 2 shows the results of Optical Microscopy for the preliminary polymer of Comparative Example 1.

FIG. 2 is an illustration provided by means of Optical Microscopy with 48× (500 μm) scale. It presents the microscopy result of the preliminary polymer produced under conditions of Comparative Example 1, without the presence of comonomer. It is possible to observe the formation large number of agglomerated particles (as indicated by the circle).

Figure 3:
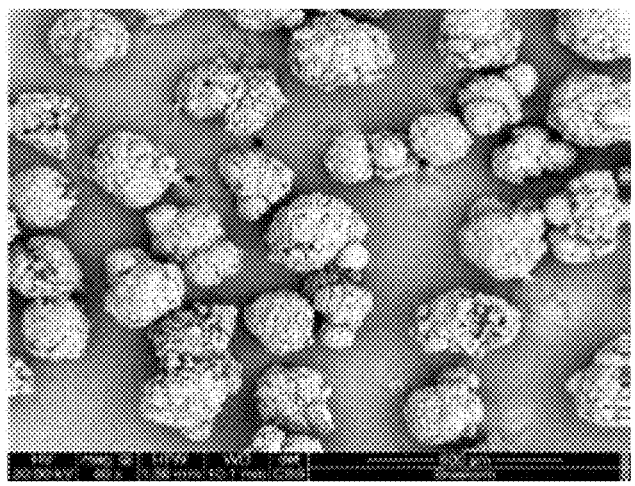
FIGS. 3 and 4 show the results of Scanning Electron Microscopy (SEM) for the preliminary polymer of Comparative Example 1.
Figure 4:
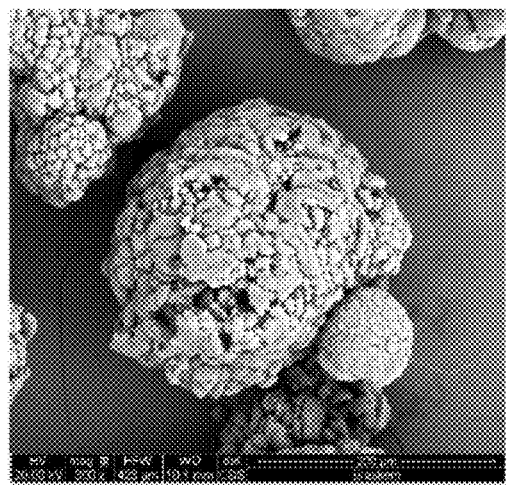

FIG. 3 and FIG. 4 are illustrations provided by means of Scanning Electron Microscopy (SEM) with 80× (500 μm) and 300× (200 μm) scale, respectively. It is possible to observe that the particles present a severely fragmented morphology, presenting large voids and with small particles adhered to the larger particles.

Figure 5:
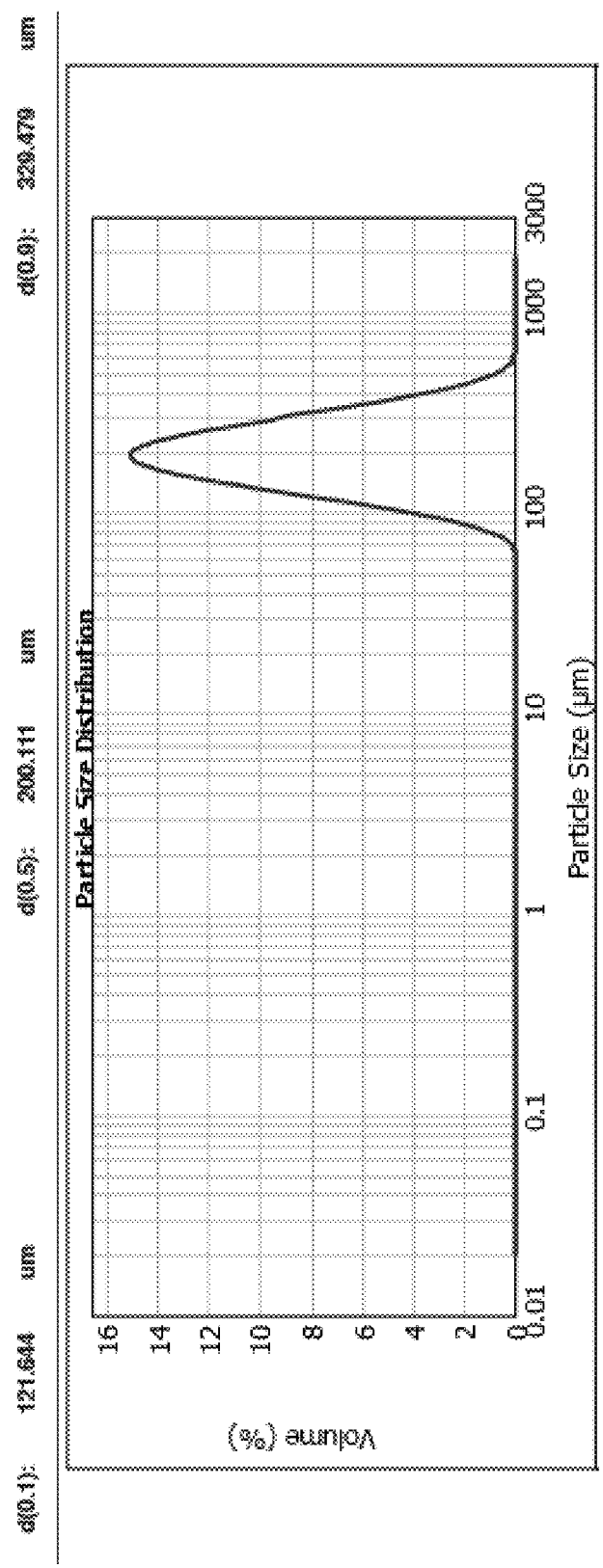
FIG. 5 shows the results of Malvern particle size analysis for the preliminary polymer of Comparative Example 1.

According to FIG. 5, the average particle size (d50) obtained with the conditions of Comparative Example 1 is around 200 μm, and d10 is around 122 μm.

Comparative Example 2: Preparation of Ethylene Preliminary Polymer with Comonomer Using Dried Supported Metallocene Catalyst 33.7 grams of preliminary polymer was produced under the same process conditions of Comparative Example 1, except for the presence of 1-hexene as comonomer. The comonomer was transferred to the reactor using a cylinder and pushed out by the required amount of diluent (propane) to minimize the contact time among the comonomer and the catalyst. The preliminary process conditions are in Table 2 and the results of the preliminary polymer characteristics are in Table 7. The results of Optical Microscopy, Scanning Electron Microscopy (SEM) and Malvern are represented in FIG. 6, FIGS. 7 and 8, and FIG. 9, respectively.

TABLE 2

Preliminary Polymerization Process
Conditions of Comparative Example 2

| | |
|---|---|
| Temperature (° C.) | 30 |
| Residence time [minutes] | 60 |
| Ethylene/Catalyst [wt ratio] | 50 |
| Hexene/ethylene [wt ratio] | 0.66 |
| Hydrogen/ethylene [wt ratio] | 0 |
| Catalyst [g] | 1.0 |
| TIBAL [g] | 0.3 |
| Propane [g] | 782 |

Figure 6:
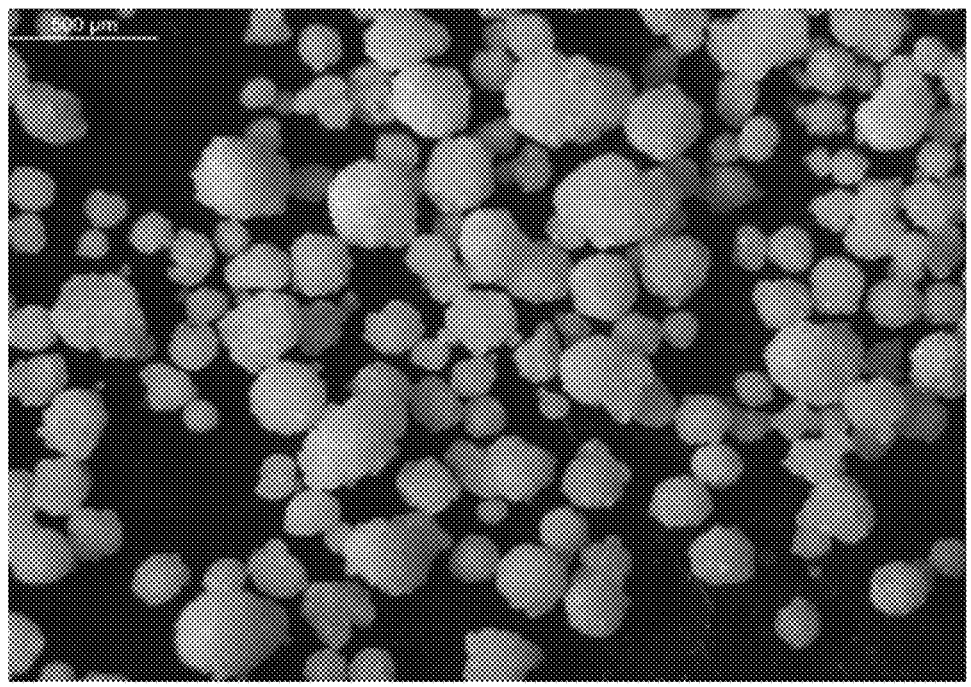
FIG. 6 shows the results of Optical Microscopy for the preliminary polymer of Comparative Example 2.

FIG. 6 is an illustration provided by means of Optical Microscopy with 48× (500 μm) scale, showing the preliminary polymer particles obtained with conditions of Comparative Example 2. It is possible to observe the formation of a few amount of agglomerated particles.

Figure 7:
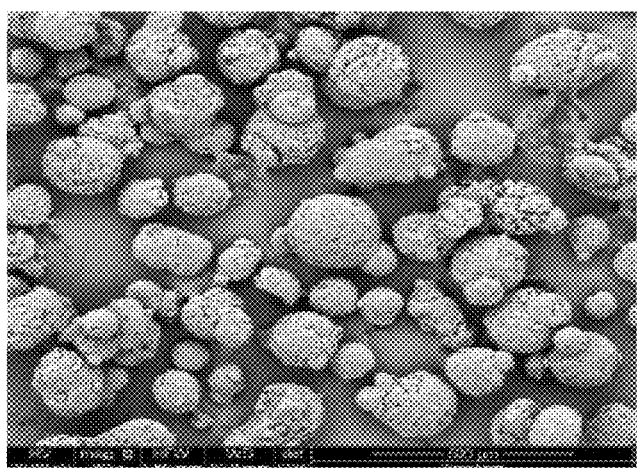
FIGS. 7 and 8 show the results of Scanning Electron Microscopy (SEM) for the preliminary polymer of Comparative Example 2.
Figure 8:
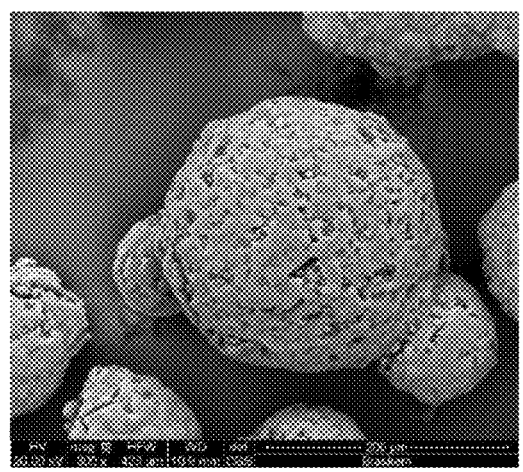

FIG. 7 and FIG. 8 are illustrations provided by means of Scanning Electron Microscopy (SEM) with 80× (500 μm) and 300× (200 μm) scale, respectively. It is possible to observe that the particles are less fragmented with a smoother surface. Comparing FIG. 4 and FIG. 8, it is possible to observe that the preliminary polymerization performed only with ethylene, even under mild conditions, produces particles with a deformed and fragmented morphology, while the presence of the comonomer in the reaction media generates particles with a more homogeneous surface, indicating a better control of the support fragmentation step.

Figure 9:
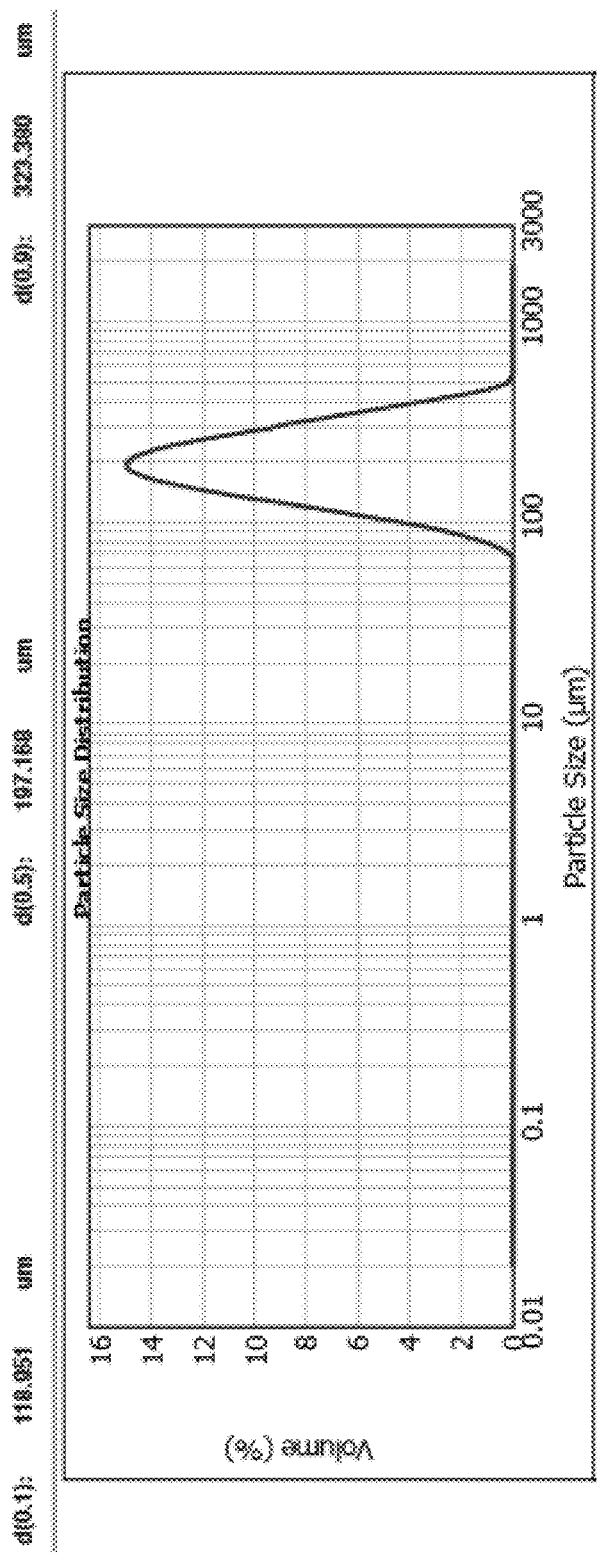
FIG. 9 shows the results of Malvern particle size analysis for the preliminary polymer of Comparative Example 2.

According to FIG. 9, the average particle size (d50) obtained with the conditions of Comparative Example 2 is around 200 μm, and d10 is around 118 μm.

Comparative Example 3: Polymerization of Ethylene/Hexene in a Gas-Phase Reactor without Prepolymerization Step Using Catalytic Mud Washing of the Catalytic Mud:

The metallocene-based catalyst supported on silica was suspended in a mixture of oil and grease, forming a so called, catalytic mud.

The catalytic mud was continuously fed to a first continuous stirred tank reactor used to wash the catalytic mud. The washing procedure was carried out continuously, using propane as solvent, following the conditions of Table 3. The washed catalytic mud was then continuously fed to the gas-phase polymerization reactor.

TABLE 3

Process Conditions of the washing step of Comparative Example 3

| | |
|---|---|
| Catalyst [g/h] | 17 |
| Propane/catalyst [kg/g] | 2.1 |
| Temperature [° C.] | 20 |
| Pressure [kgf/cm$^2$] | 21 |
| Residence time [minutes] | 65 |

Polymerization Step:

68.5 kg/h of linear low density polyethylene was produced under the process conditions of Table 4. The polymerization reaction was carried out in one gas phase reactor (GPR). The results of the polymer characteristics are in Table 8.

TABLE 4

Polymerization Process Conditions

| | |
|---|---|
| Temperature [° C.] | 70-90 |
| Pressure [kgf/cm$^2$] | 20-30 |
| Residence time [hour] | 2.5-5.0 |
| H2/ethylene [ppm/mol] | 1-10 |
| C6/C6 + C2 [mol/mol] | 0.01-0.1 |
| Partial pressure of ethylene (kgf/cm$^2$) | 1-5 |

Example 4: Polymerization of Ethylene/Hexene in Gas-Phase Reactor with Prepolymerization Step Using Catalytic Mud Washing of the Catalytic Mud:

The washing of the catalyst paste occurred according to the procedure described in Comparative Example 3 and the process conditions of Table 3.

Preliminary Polymerization Step:

703.8 g/h of preliminary polymer was produced under the process conditions of Table 5. The preliminary polymerization reaction was performed in liquid phase. The catalytic mud after the washing step (mentioned above) was continuously fed to the preliminary polymerization loop reactor in the amount of 17 g/h of dry catalyst in form of catalytic mud. The results of the preliminary polymer characteristics are in Table 7. The results of Optical Microscopy, Scanning Electron Microscopy (SEM) and Malvern are represented in FIG.

Figure 13:
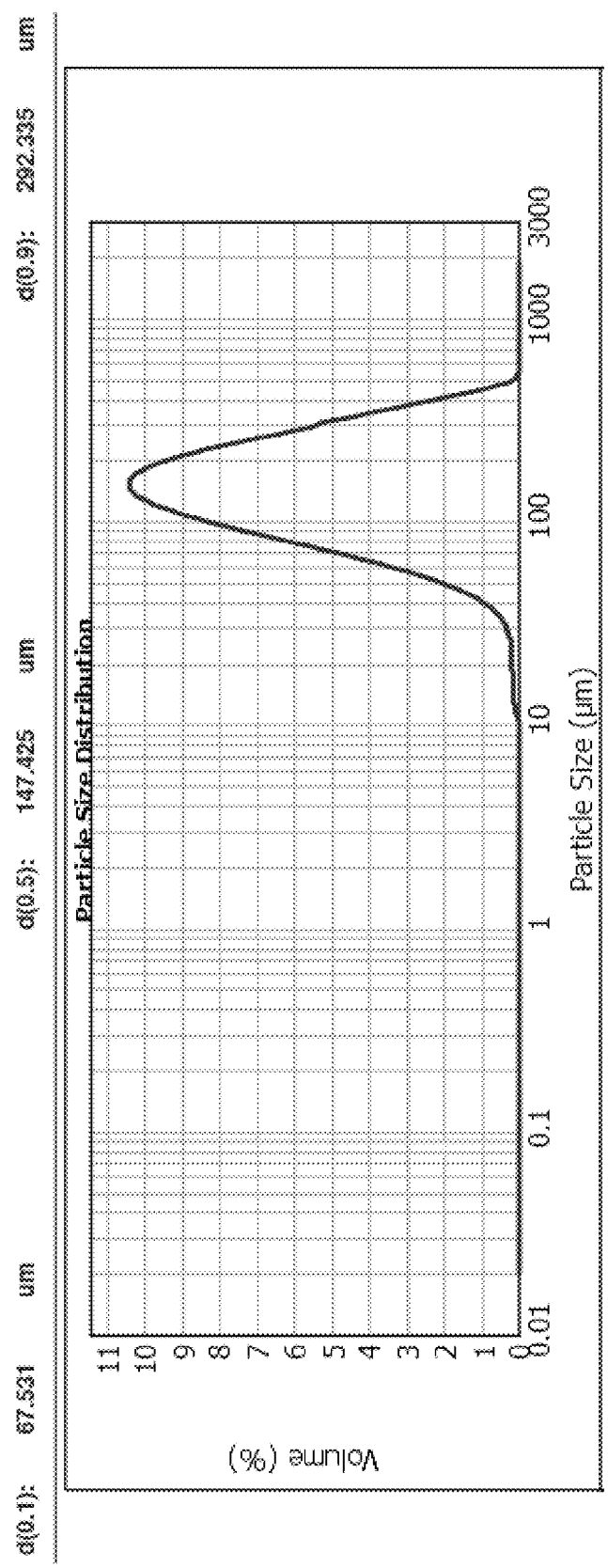
FIG. 13 shows the results of Malvern particle size analysis for the preliminary polymer of Example 4.

10, FIGS. 11 and 12 and FIG. 13, respectively. The preliminary polymer obtained in the preliminary polymerization loop reactor was then continuously fed to a gas phase polymerization reactor (GPR).

From the comonomer content incorporated in the prepolymer, it is possible to define the amount of unreacted comonomer transferred from the continuous loop pre-polymerization reactor to the gas-phase polymerization reactor.

Total amount of comonomer continuously fed into the preliminary polymerization reactor: 1.02 kg/h Comonomer incorporation: 8.7 wt %

Total amount of comonomer continuously fed into the gas phase reactor: 4.90 kg/h Unreacted comonomer from preliminary polymerization reactor to GPR: ~19% based in the total amount in the GPR.

TABLE 5

Preliminary Polymerization Process Conditions of Example 4

| | |
|---|---|
| Temperature [° C.] | 30 |
| Pressure [kgf/cm²] | 21 |
| Residence time [minutes] | 90 |
| Catalyst flow [g/h] | 17 |
| Ethylene/Catalyst [wt ratio] | 50 |
| Comonomer/ethylene [wt ratio] | 1.2 |
| Hydrogen/ethylene [g/kg] | 0 |
| Antistatic agent [ppm] | 0 |
| Unreacted comonomer to GPR [%] | 19% |

FIG. 10 is an illustration provided through Stereo Microscopy with 48× (500 µm) scale, showing the preliminary polymer particles obtained with conditions of Example 4. It is possible to observe some smaller particles stuck to larger particles, but without loss of morphology.

FIG. 11 and FIG. 12 are illustrations provided by means of Scanning Electron Microscopy (SEM) with 100× (500 µm) and 300× (200 µm) scale, respectively.

According to FIG. 13 the average particle size (d50) obtained with the conditions of Example 4 was around 147 µm, and d10 was around 67.53 µm.

Polymerization Step:

76.4 kg/h of linear low density polyethylene was produced under the process conditions of Table 4. The polymerization reaction was carried out in one gas phase reactor (GPR). The results of the polymer characteristics are in Table 8.

Figure 14:
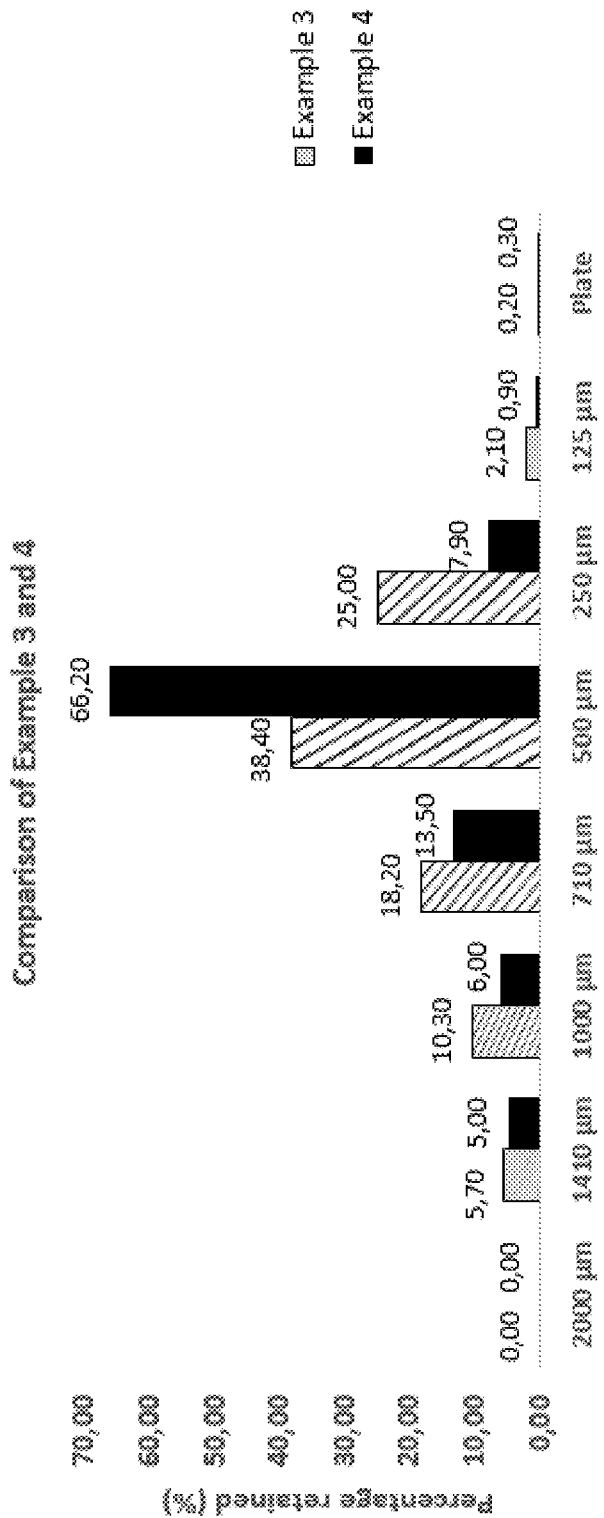
FIG. 14 illustrates a comparison of the particle size distribution between Comparative Example 3 and Example 4.

FIG. 14 illustrates the comparison of the particle size distribution between Comparative Example 3 and Example 4. It can be seen that in the condition of Comparative Example 3 there was a higher presence of particles smaller than 500 µm.

Example 5: Polymerization of Ethylene/Hexene in Gas-Phase Reactor with Prepolymerization Step Using Catalytic Mud Washing of the Catalytic Mud:

The washing of the catalyst paste occurred according to the procedure described in Comparative Example 3 and the process conditions of Table 3.

Preliminary Polymerization Step:

981.75 g/h of preliminary polymer was produced as Example 4, under the process conditions of Table 6. The results of the preliminary polymer characteristics are in Table 7. The results of Optical Microscopy, Scanning Electron Microscopy (SEM) and Malvern are represented in FIG. 15, FIGS. 16 and 17 and FIG. 18, respectively. The preliminary polymer obtained in the preliminary polymerization loop reactor was continuously fed to the gas phase polymerization reactor.

From the comonomer content incorporated in the prepolymer, it is possible to define the amount of unreacted comonomer transferred from the continuous pre-polymerization reactor to the polymerization reactor.

Total amount of comonomer continuously fed into the preliminary polymerization reactor: 1.02 kg/h Comonomer incorporation: 4.1 wt %

Total amount of comonomer continuously fed into the gas phase reactor: 4.96 kg/h.

Unreacted comonomer to GPR: ~19.7%.

TABLE 6

Preliminary Polymerization Process Conditions of Example 5

| | |
|---|---|
| Temperature [° C.] | 30 |
| Pressure [kgf/cm²] | 21 |
| Residence time [minutes] | 90 |
| Catalyst flow [g/h] | 17 |
| Ethylene/Catalyst [wt ratio] | 100 |
| Comonomer/ethylene [wt ratio] | 0.6 |
| Hydrogen/ethylene [g/kg] | 0 |
| Antistatic agent [ppm] | 0 |
| Unreacted comonomer to GPR [%] | 19.7 |

Figure 15:
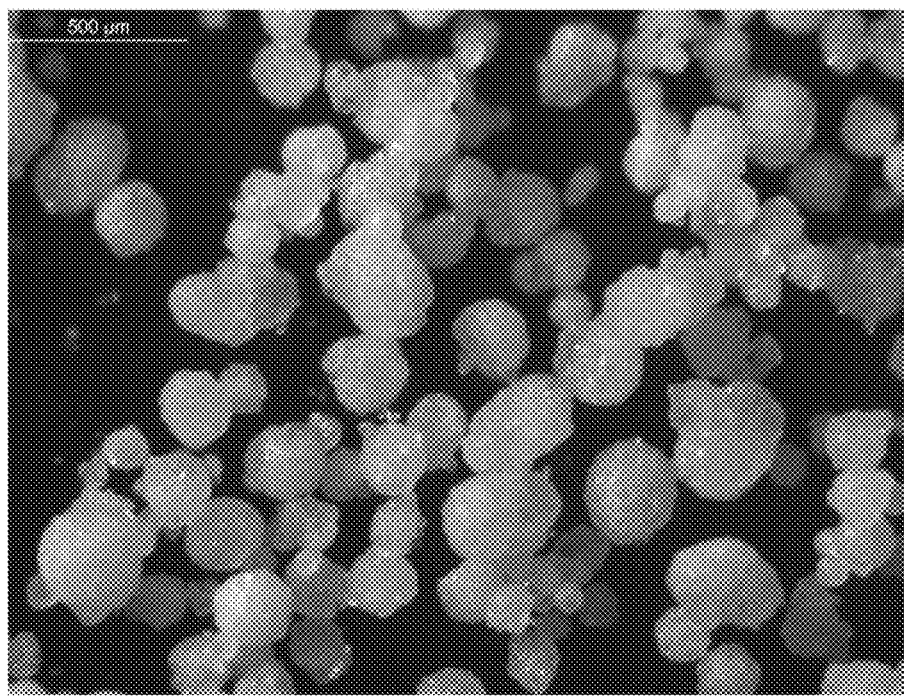
FIG. 15 shows the results of Optical Microscopy for the preliminary polymer of Example 5.

FIG. 15 is an illustration provided by means of Optical Microscopy with 48× (500 µm) scale, showing the preliminary polymer particles obtained with conditions of Example 5. It is possible to observe that the particles have good morphology, with very few amount of agglomerated particles, but without the loss of morphological.

Figure 16:
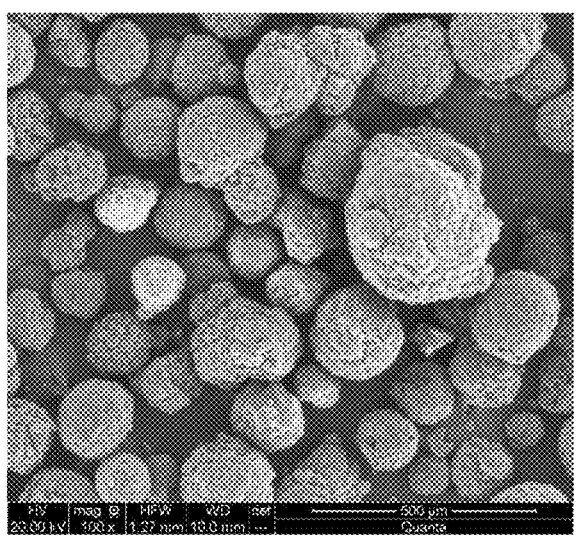
FIGS. 16 and 17 show the results of Scanning Electron Microscopy (SEM) for the preliminary polymer of Example 5.
Figure 17:
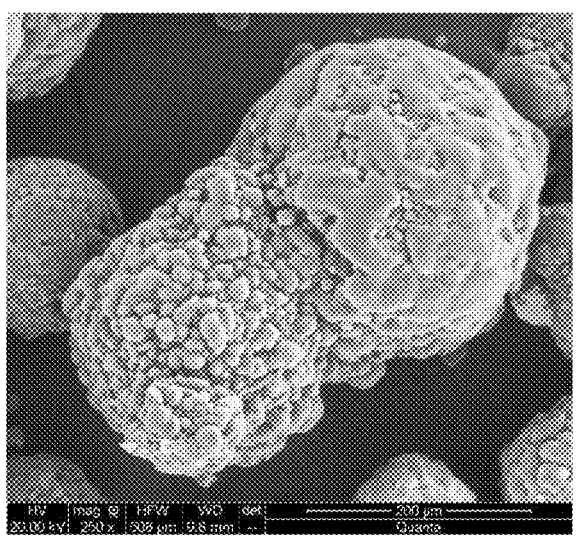

FIG. 16 and FIG. 17 are illustrations provided by means of Scanning Electron Microscopy (SEM) with 100× (500 µm) and 250× (200 µm) scale, respectively. Comparing FIG. 11 and FIG. 16, it is possible to observe that the preliminary polymerization carried out with higher $C_2$/Catalyst mass ratio generates particles with a more homogeneous surface, indicating a better initial evolution of the support fragmentation process.

Figure 18:
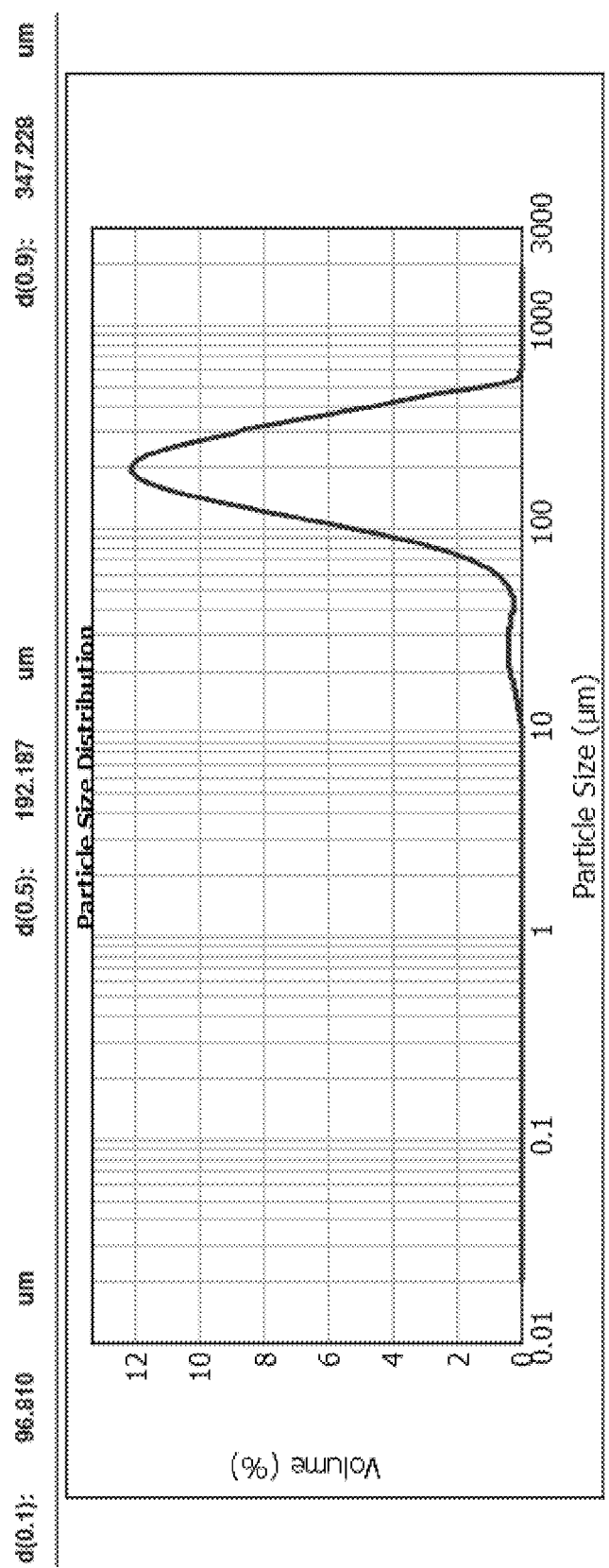
FIG. 18 shows the results of Malvern particle size analysis for the preliminary polymer of Example 5.

According to FIG. 18, the average particle size (d50) obtained with the conditions of Example 5 was 192 µm, and d10 was 96.8 µm.

Polymerization Step:

72 kg/h of polymer was produced under the process conditions of Table 4. The polymerization reaction was carried out in one gas phase reactor (GPR). The results of the polymer characteristics are in Table 8.

Figure 19:
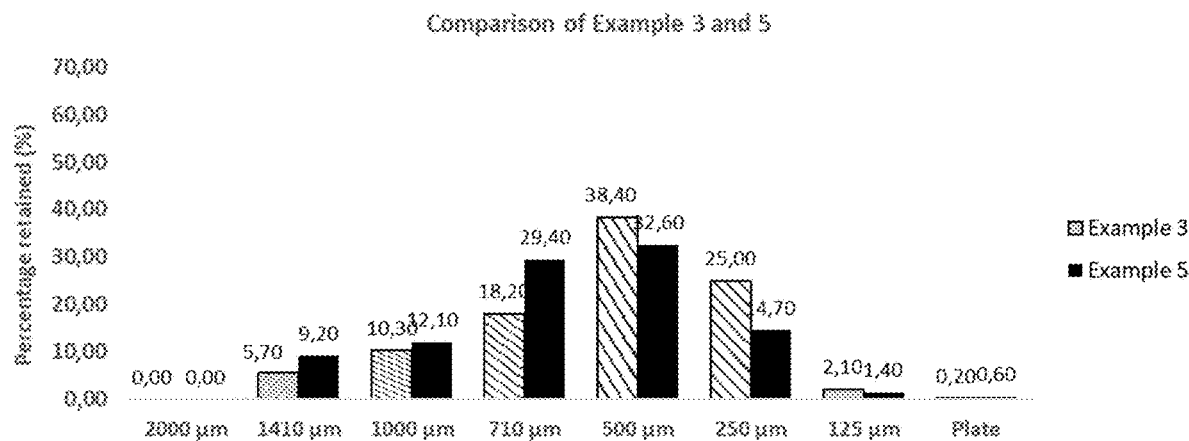
FIG. 19 illustrates a comparison of the particle size distribution between Comparative Example 3 and Example 5.

FIG. 19 illustrates the comparison of the particle size distribution between Comparative Example 3 and Example 5.

Figure 20:
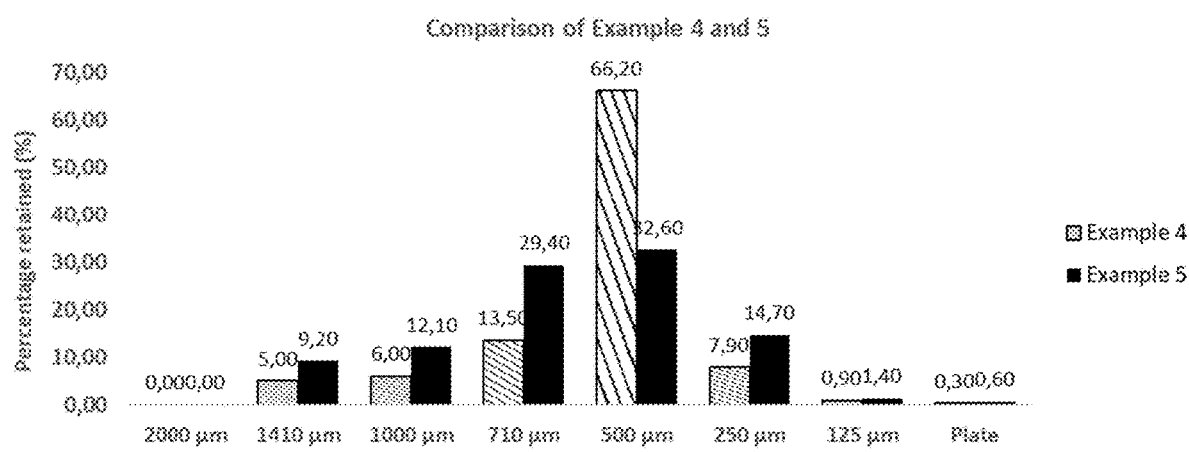
FIG. 20 illustrates a comparison of the particle size distribution between Example 4 and Example 5.

FIG. 20 illustrates the comparison of the particle size distribution between Examples 4 and 5.

Figure 21:
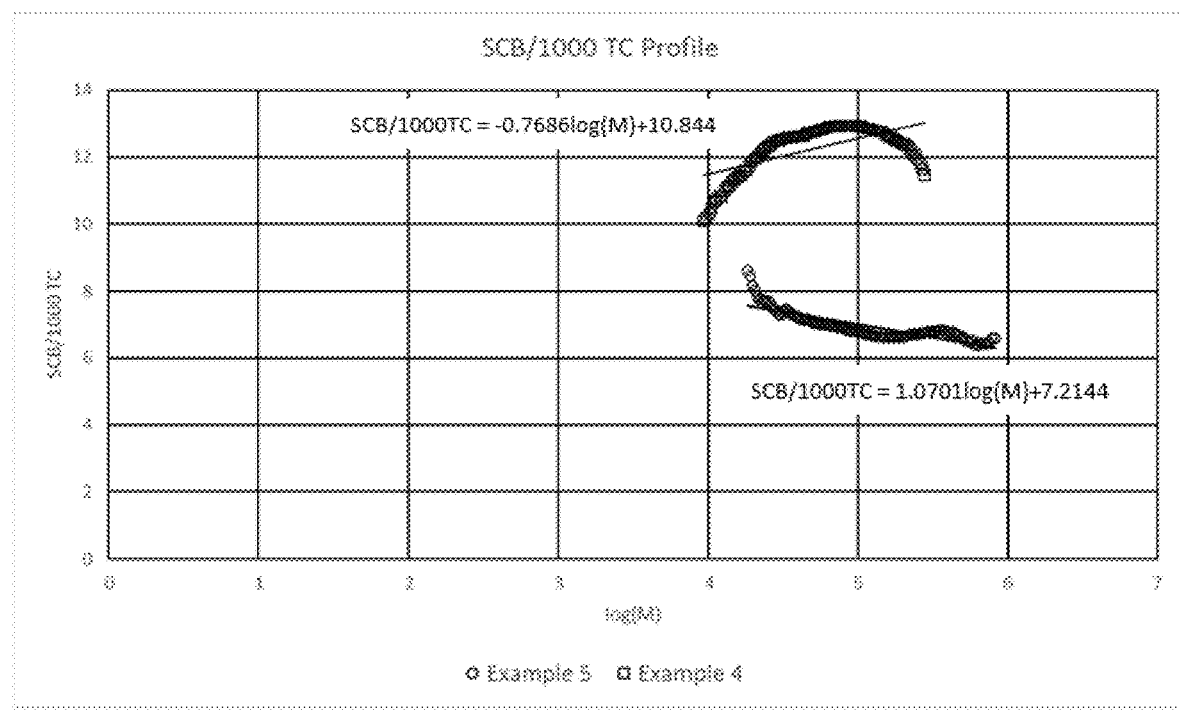
FIG. 21 illustrates the SCB/1000 TC profile comparison of Examples 4 and 5.

FIG. 21 illustrates the SCB/1000 TC profile comparison of Examples 4 and 5.

TABLE 7

Preliminary Polymer Results

| | Comparative Example 1 | Comparative Example 2 | Example 4 | Example 5 |
|---|---|---|---|---|
| pre-polymer/catalyst [g/g] | 35.7 | 33.7 | 41.4 | 57.8 |
| Comonomer incorporation [wt %] | 0 | 2.9 | 8.7 | 4.1 |
| d50 [μm] | 200 | 197 | 147.43 | 192.2 |
| d10 [μm] | 122 | 118.95 | 67.53 | 96.8 |
| Average molecular weight (Mw) [kDa] | — | — | 169,993 | 193,267 |
| Average molecular weight number (Mn) [kDa] | — | — | 42,867 | 64,133 |
| Molecular Weight Distribution (Mw/Mn) | — | — | 3.97 | 3.01 |
| SCB/1000 TC | | | 12.26 | 6.95 |
| Melting temperature (Tm) [° C.] | — | — | 109 | 121 |
| Pre-polymer/polymer [wt %] | — | — | 0.92 | 1.36 |

TABLE 8

Results of polymer characteristics

| | Comparative Example 3 | Example 4 | Example 5 |
|---|---|---|---|
| Melt Flow Rate (190° C./ 2.16 kg) [g/10'] | 3.4 | 3.7 | 3.9 |
| Polymer Density [g/cm$^3$] | 0.919 | 0.918 | 0.920 |
| Bulk density [g/cm$^3$] | 0.401 | 0.446 | 0.442 |
| Flowability [s] | 18.94 | 20.43 | 19.48 |
| Average particle size (D50) [μm] | 624 | 630 | 715 |
| Fines content (≤120 μm) [wt %] | 2.3 | 1.2 | 2.0 |

Example 6: Washing of the Catalyst Mud in the Bench Scale Reactor

A dried metallocene-based catalyst was prepared according to teachings of the U.S. Pat. No. 8,324,126, incorporated herein as reference in its entirety, following the steps below:
a) Preparation of the Catalytic Support In a 5 L reactor equipped with mechanical agitation and previously purged with nitrogen, 44.5 g (0.462 mol) of MgCl$_2$ and 2.5 L of dry THF were placed. This mixture was heated to 60° C. and stirred at 100 rpm for 5 h for complete solubilization of MgCl$_2$. The solution obtained was, after this period, cooled to 35° C. To this solution was added 300 g of silica XPO-2402, previously dehydrated at 600° C. and treated with 22.3 ml (0.163 mol) of TEAL diluted in n-hexane for 50 minutes at 25° C. Once the silica addition was complete, the mixture was heated to 60° C. and stirred at 100 rpm for 1 h. After this period, stirring was stopped and evaporation of the THF under vacuum was started until the THF content incorporated in the support reached a range between 8 and 12% w/w.
b) Preparation of the Supported Complex In a 200 mL reactor equipped with mechanical agitation and previously purged with nitrogen, 6.1 g of the catalytic support prepared in step a) and 50 mL of n-hexane were placed. 3.15 mL (9.2 mmol) of TNHAL diluted in n-hexane (Al/THF=1) was slowly added to this suspension, stirred at 200 rpm and at a temperature of 25° C. The suspension was stirred for 2 h and after this period, the solvent was siphoned off. The catalytic support obtained after this treatment was characterized with the following characteristics:

In a schlenk, equipped with a magnetic stirrer and immersed in a hot oil bath, 0.61 g (2.8 mmol) of CpTiCl$_3$ and 70 mL of n-hexane were transferred. 1.4 mL (5.5 mmol) of TIBAL diluted in n-hexane (Al/Ti=2) was slowly added to this suspension heated to 50° C. under stirring. The dark solution obtained was stirred for 2.5 h at 50° C.

On the catalytic support obtained after the treatment with TNHAL, 50 ml of n-hexane were again added, and the suspension was heated to 50° C. On top of this suspension stirred at 100 rpm, the dark solution of CpTiCl$_3$/TIBAL was slowly added and, after completion of the addition, the suspension was stirred at 100 rpm at 50° C. for 2 h. After this period, the temperature was reduced to 30° C. The solid obtained was filtered and dried under fluidization with nitrogen.

5 g of dried supported metallocene-based catalyst, prepared according to the teachings above, was suspended in a mixture of 30 g white mineral oil and 6 g of paraffin wax, forming a so called, catalytic mud.

A sufficient amount of catalytic mud, to measure a total of 1 g of the solid metallocene-based catalyst was transferred under nitrogen flow, to a 3.5 L reactor, which was purged with nitrogen flow at 70° C. for 2 hours prior the washing procedure. 1 Kg (approx. 1700 mL) of dry hexane was, in the sequence, transferred to the reactor. The reactor temperature was set to 40° C., and after reach the temperature, the reactor was pressurized with nitrogen to 21 bar and the agitator (500 rpm) was turned on. Stirring was kept for 60 min. After this period, the agitator was shut-off, and the supported metallocene catalyst was transferred via cannula to a schlenck filter under nitrogen flow. The catalyst was dried under nitrogen flow at 25° C. during 6 hours and after under vacuum for additional 4 hours.

The results of bare catalyst and the catalyst after catalytic mud preparation and washing steps are presented in Table 9.

TABLE 9

Comparative results between bare catalyst and catalytic mud washed

| Results | Bare catalyst | Washed catalytic mud |
|---|---|---|
| D50 (μm) | 64.6 | 67.9 |
| D10 (μm) | 36.2 | 30.3 |

TABLE 9-continued

Comparative results between bare
catalyst and catalytic mud washed

| Results | Bare catalyst | Washed catalytic mud |
|---|---|---|
| Total intrusion volume (mL/g) | 0.81 | 0.36 |
| Total pore area (m²/g) | 145 | 46 |

While the scope of the composition and method are described with several embodiments, it is understood that one of ordinary skill in the relevant art will appreciate that many examples, variations and alterations to the composition and methods described here are within the scope and spirit of the disclosure. Accordingly, the embodiments described are set forth without any loss of generality, and without imposing limitations, on the disclosure. Those of skill in the art understand that the scope includes all possible combinations and uses of particular features described in the specification.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A process for preliminary polymerization, comprising:
    washing a catalyst mud comprising a supported metallocene catalyst with a solvent at a temperature from 0° C. to 40° C., a pressure from 20 to 40 kgf/cm², and a residence time of at least 30 minutes;
    continuously feeding the washed catalytic mud to a continuous pre-polymerization reactor; and
    pre-polymerizing, in the continuous pre-polymerization reactor, ethylene and at least one $C_4$ to $C_{10}$ α-olefin as comonomer, with the washed catalytic mud, in the presence of an inert diluent, to produce a pre-polymer.

2. The process according to claim 1, wherein the catalyst mud comprises the supported metallocene catalyst mixed with mineral oil, grease, wax, or paraffin, or a combination thereof.

3. The process according to claim 1, wherein the solvent comprises a saturated hydrocarbon selected from the group consisting of propane, butane, iso-butane, pentane, iso-pentane, hexane, heptane and combinations thereof.

4. The process according to claim 1, wherein the inert diluent is selected from the group consisting of $C_3$-$C_7$ alkanes and combinations thereof.

5. The process according to claim 1, wherein the continuous pre-polymerization reactor is a tubular reactor, a continuous stirred tank reactor (CSTR), or a loop reactor.

6. The process according to claim 1, wherein an amount of hydrogen ranging from 0 to 0.05 gram of hydrogen per kilogram of ethylene is present in the continuous pre-polymerization reactor.

7. The process according to claim 1, wherein the supported metallocene catalyst, after washing, has:
    a d50 ranging from 35 to 70 μm;
    a d10 ranging from 14 to 40 μm;
    a total intrusion volume less than or equal to 1 mL/g; and
    a total pore area less than or equal to 100 m²/g.

8. The process according to claim 1, wherein washing the catalytic mud uses from 1 to 10 kg of solvent per gram of the supported metallocene catalyst.

9. The process according to claim 1, wherein an ethylene/supported metallocene catalyst mass ratio fed into the continuous pre-polymerization reactor is in the range of 5 to 150; and a comonomer/ethylene mass ratio fed into the continuous pre-polymerization reactor is in the range of 0.1 to 1.2.

10. The process according to claim 1, wherein a polymerization degree of the pre-polymerized polymer is less than 60 g of polymer per gram of supported metallocene catalyst.

11. The process according to claim 1, further comprising continuously feeding the pre-polymerized polymer to a polymerization reactor.

12. The process according to claim 11, wherein the polymerization reactor is a gas phase reactor.

13. The process according to claim 11, wherein an amount of unreacted comonomer transferred from the continuous pre-polymerization reactor to the polymerization reactor is no more than 10 wt % of the total amount of comonomer continuously fed into the polymerization reactor.

14. The process according to claim 1, wherein the preliminary polymerization is carried out in presence of an antistatic agent in the range of 1 to 10 wppm based on the total amount of monomer, comonomer, and inert diluent present in the pre-polymerization reactor.

15. The process according to claim 1,
    wherein an average residence time in the continuous pre-polymerization reactor is more than 90 minutes and less than 240 minutes, a reactor temperature is from 10° C. to 50° C., and a reactor pressure is from 20 to 40 kgf/cm².

* * * * *